United States Patent
Kobayashi

(10) Patent No.: US 7,431,309 B2
(45) Date of Patent: Oct. 7, 2008

(54) GROUND CONTACT LOAD CONTROL APPARATUS FOR A VEHICLE

(75) Inventor: Toshiyuki Kobayashi, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 465 days.

(21) Appl. No.: 10/522,551

(22) PCT Filed: May 16, 2003

(86) PCT No.: PCT/JP03/06093
§ 371 (c)(1),
(2), (4) Date: Jan. 27, 2005

(87) PCT Pub. No.: WO2004/014674
PCT Pub. Date: Feb. 19, 2004

(65) Prior Publication Data
US 2005/0236782 A1    Oct. 27, 2005

(30) Foreign Application Priority Data
Aug. 7, 2002    (JP)    ............... 2002-230299

(51) Int. Cl.
    *B60G 17/00*    (2006.01)
(52) U.S. Cl. ................................. 280/6.159
(58) Field of Classification Search ............ 280/5.505, 280/6.15, 6.151, 6.155, 6.157, 6.159; 180/41; 701/37, 41
See application file for complete search history.

(56) References Cited

U.S. PATENT DOCUMENTS

| | | | |
|---|---|---|---|
| 3,032,349 A | 5/1962 | Fiala et al. | |
| 4,761,022 A | 8/1988 | Ohashi et al. | |
| 4,892,329 A | 1/1990 | Kozaki et al. | |
| 5,116,077 A | 5/1992 | Karnopp et al. | |
| 5,517,414 A | 5/1996 | Hrovat | |
| 5,601,307 A * | 2/1997 | Heyring et al. | ........... 280/6.157 |
| 6,663,113 B2 * | 12/2003 | Schulke et al. | ........... 280/5.505 |
| 2004/0169345 A1 | 9/2004 | Fontdecaba Buj | |

FOREIGN PATENT DOCUMENTS

| | | |
|---|---|---|
| DE | 1 214 553 | 4/1966 |
| DE | 28 10 629 A1 | 9/1979 |
| DE | 34 26 734 A1 | 8/1985 |

(Continued)

*Primary Examiner*—Faye M. Fleming
(74) *Attorney, Agent, or Firm*—Oliff & Berridge, PLC

(57) ABSTRACT

In a ground contact load control apparatus for a vehicle having front and rear, left and right load bearing means (11, 12, 13, 14) which support the ground contact load of each of the front and rear, left and right wheels, respectively, a load changing means which can operate to change the ground contact load supported by these load bearing means, vehicle state sensing means (sensors) which sense the state of the vehicle, and a control means (electric control unit ECU) which controls the operation of the load changing means in accordance with signals from the vehicle state sensing means, load changing means (50, 60) which can increase and decrease the ground contact load of any pair of diagonally opposed wheels and the ground contact load of the other pair of diagonally opposed wheels in opposite directions and which can operate to increase or decrease the ground contact load of diagonally opposed wheels in the same direction are used as the load changing means.

15 Claims, 24 Drawing Sheets

FOREIGN PATENT DOCUMENTS

| | | |
|---|---|---|
| DE | 36 18 055 A1 | 12/1986 |
| DE | 39 36 987 A1 | 5/1991 |
| DE | 198 46 500 A1 | 4/2000 |
| EP | 0 108 008 A1 | 5/1984 |
| EP | 0 236 947 A2 | 9/1987 |
| EP | 0 426 995 A2 | 5/1991 |
| EP | 0 992 373 A2 | 4/2000 |
| EP | A 0 992 373 | 4/2000 |
| EP | 1 231 086 A1 | 8/2002 |
| ES | 2 159 243 A1 | 9/2001 |
| FR | 1 208 760 A | 2/1960 |
| GB | 844145 | 8/1960 |
| JP | A 61-285111 | 12/1986 |
| JP | A 1-95927 | 4/1989 |
| JP | A 2-175403 | 7/1990 |
| JP | A 2-182529 | 7/1990 |
| JP | A 5-50825 | 3/1993 |
| JP | B2 5-85368 | 12/1993 |
| JP | A 6-92128 | 4/1994 |
| JP | A 6-183240 | 7/1994 |
| JP | A 6-247130 | 9/1994 |
| JP | A 6-509997 | 11/1994 |
| JP | B2 7-17142 | 3/1995 |
| JP | A 7-257143 | 10/1995 |
| JP | B2 8-5294 | 1/1996 |
| JP | B2 8-9288 | 1/1996 |
| JP | A 11-91329 | 4/1999 |
| JP | A 11-217017 | 8/1999 |
| JP | A 2000-71736 | 3/2000 |
| JP | A 2000-127733 | 5/2000 |
| WO | WO 93/01948 A1 | 2/1993 |
| WO | WO 95/11813 | 5/1995 |
| WO | WO 01/08910 A1 | 2/2001 |

\* cited by examiner

MAP OF VEHICLE SPEED, GEAR RATIO,
AND ROLLING STIFFNESS DISTRIBUTION

MAP OF YAW RATE DEVIATION AND
ROLLING STIFFNESS DISTRIBUTION

FIG.16A
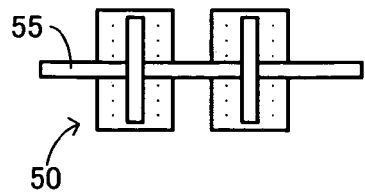
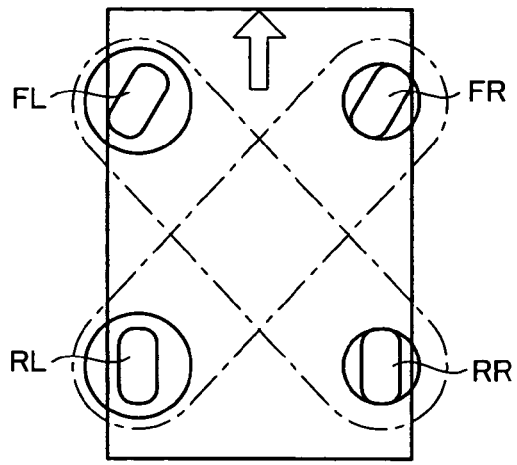
FIG.16B
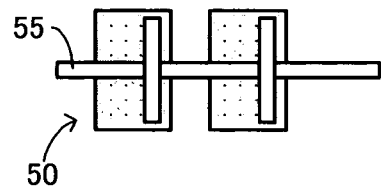
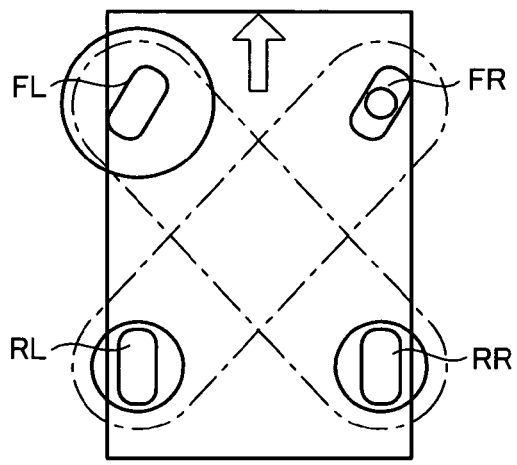
FIG.16C
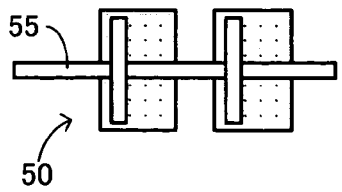
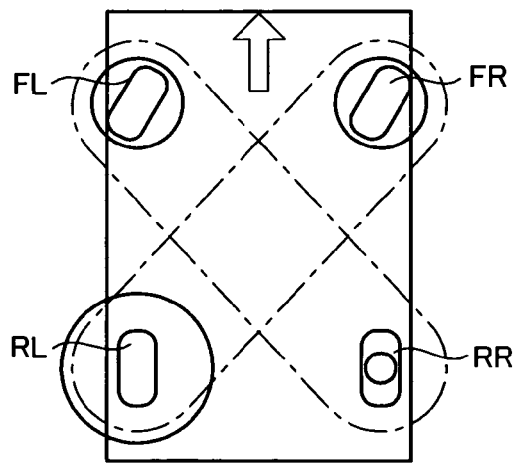

FIG.17A
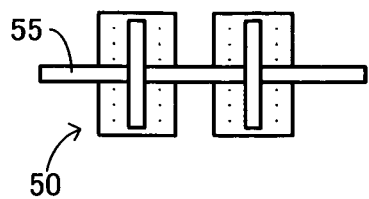 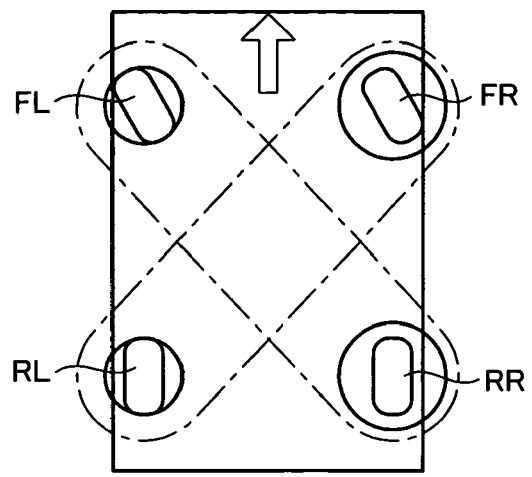
FIG.17B
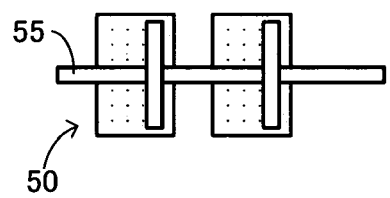 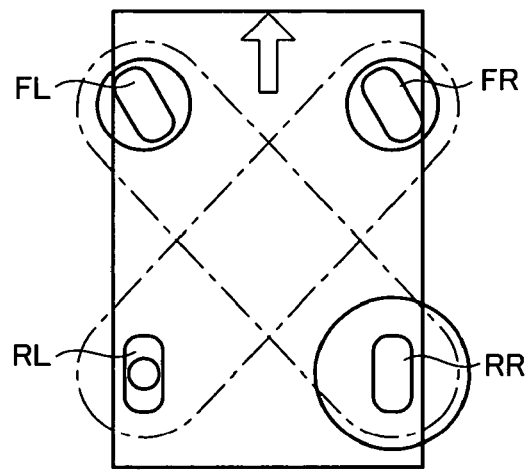
FIG.17C
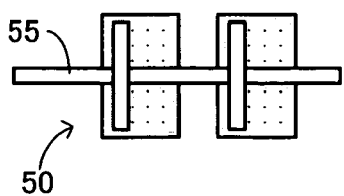 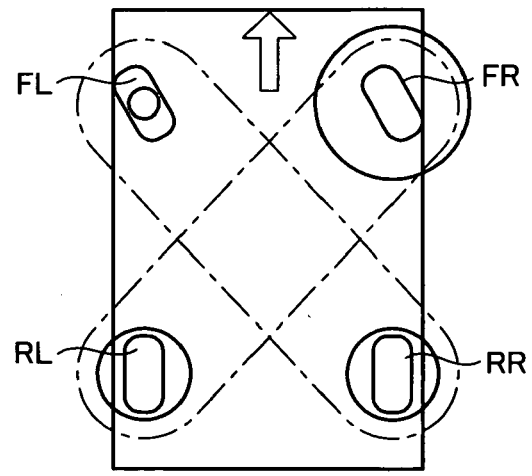

GROUND CONTACT LOAD CONTROL APPARATUS FOR A VEHICLE

TECHNICAL FIELD

This invention relates to a ground contact load control apparatus used in a vehicle such as a 4-wheel automobile.

BACKGROUND ART

This type of ground contact load control apparatus is shown in Japanese Patent Application Laid-Open (koka,) No. H11-91329, for example. In the ground contact load control apparatus shown in that publication, a reaction force which is produced through operation of moving a sprung mass up and down by use of an active cylinder provided for each of the wheels is caused to act on the ground contact surface to thereby control the ground contact load.

In the ground contact load control apparatus shown in the above-described publication, the ground contact load of each wheel is changed by separately controlling the active cylinder provided for each wheel. Therefore, when the ground contact load of each wheel is changed, there is not only the concern of an accompanying change in the attitude of the vehicle body, but there is also the possibility of vertical vibrations being generated.

DISCLOSURE OF THE INVENTION

One object of the present invention is to impart an oversteering tendency or an understeering tendency to the steering characteristics while restraining changes in the attitude of a vehicle.

In order to achieve this object, in the present invention, a ground contact load control apparatus for a vehicle which comprises front and rear, left and right load bearing means for supporting the ground contact load of the front and rear, left and right wheels respectively, a load changing means which can operate to change the load supported by each of the load bearing means, a vehicle state sensing means which senses the state of the vehicle, and a control means which controls the operation of the load changing means in accordance with a signal from the vehicle state sensing means is characterized in that a load changing means which can increase or decrease the ground contact load of any pair of diagonally opposed wheels and the ground contact load of the other pair of diagonally opposed wheels in opposite directions from each other and which can increase or decrease the ground contact load of diagonally opposed wheels in the same direction is employed as the load changing means.

According to this invention, the operation of the load changing means can be controlled by the control means in accordance with the state of the vehicle. For example, during a turn, the ground contact load of one pair of diagonally opposed wheels can be increased and the ground contact load of the other pair of diagonally opposed wheels can be decreased, and the ground contact load in each pair of diagonally opposed wheels can be increased or decreased in the same direction. As a result, during a left turn, for example, by decreasing the ground contact load of both the right front wheel and the left rear wheel and increasing the ground contact load of both the left front wheel and the right rear wheel, the load movement can be supported by the rear side (or in other words, the rear rolling stiffness distribution can be increased), and the steering characteristics can be given a tendency towards oversteering while restraining a change in the attitude of the vehicle. Alternatively, at this time, by decreasing the ground contact load of both the left front wheel and the right rear wheel and increasing the ground contact load of both the right front wheel and the left rear wheel, the load movement can be supported by the front side (or in other words, the rolling stiffness distribution of the front wheels can be increased), and the steering characteristics can be given a tendency towards understeering while restraining a change in the attitude of the vehicle.

In carrying out the present invention, the front and rear, left and right load bearing means which support the ground contact load of the front and rear, left and right wheels may comprise front and rear, left and right suspension hydraulic cylinders having a port and mounted on a corresponding one of the front and rear, left and right wheels, and the load changing means which can operate to change the ground contact load which is supported by each of the suspension hydraulic cylinders may comprise ground contact load control hydraulic cylinders which receive the hydraulic pressure from each of the suspension hydraulic cylinders and operate based on the pressure difference, and an actuator which imparts an operating force to the ground contact load control hydraulic cylinders. In this case, the ground contact load of each wheel can be suitably changed by controlling the operation of the actuator by the control means in accordance with the state of the vehicle.

In this case, a pitching control hydraulic cylinder which controls pitching of the vehicle body, a rolling control hydraulic cylinder which controls rolling of the vehicle body, and a heave control hydraulic cylinder which controls bouncing of the vehicle body can be provided in a hydraulic circuit including each of the suspension hydraulic cylinders and the ground contact load control hydraulic cylinders. In this case, it is possible to control the ground contact load of each wheel, and it is possible to control behavior such as bouncing, pitching, and rolling of the vehicle body.

An accumulator and a damping valve can be provided for each suspension hydraulic cylinder. In this case, it is possible to control the ground contact load of each wheel, and the function of absorbing vibrations from the road surface can be easily added using a simple structure.

A damping means and an elastic means can be provided between the ground contact load control hydraulic cylinders and the actuator. In this case, control is performed such that operation of the ground contact load control hydraulic cylinders is always permitted by the damping means and the elastic means, so the input of vibrations from the road surface can be absorbed by the damping means and the elastic means, and the ride comfort can be increased.

A releasing means which makes it possible for the ground contact load control hydraulic cylinders to freely move can be provided. In this case, when it is not necessary to control the ground contact load of each wheel, free operation of the ground contact load control hydraulic cylinders is permitted by the releasing means, so the transmission of vibrations input from the road surface can be cut off, and the ride comfort can be increased.

A securing means which disables the operation of the ground contact load control hydraulic cylinders can be provided. In this case, at the time of a failure of the actuator, it is possible to disable the operation of the ground contact load control hydraulic cylinders by the securing means, and unexpected behavior can be prevented. In addition, when there is excessive input of vibrations from the road surface, if the operation of the ground contact load control hydraulic cylinders is disabled, the required output from the actuator can be decreased, and the size of the actuator and the energy consumed by the actuator can be decreased.

When carrying out the present invention, the vehicle state sensing means may comprise a tire pressure sensing means which senses the tire pressure of each of the front and rear, left and right wheels. In this case, the ground contact load of a wheel with a low tire pressure can be reduced, and tire damage can be decreased.

When carrying out the present invention, the control means may comprise an operating amount determining means which determines the operating amount of the load changing means in accordance with a signal from the vehicle state sensing means. In this case, the ground contact load of each wheel can be controlled to a suitable amount. For example, at high speeds, an understeering tendency can be imparted to increase safety, and at low speeds, an oversteering tendency can be imparted to increase maneuverability.

When carrying out the present invention, the control means may comprise an operating speed determining means which determines the operating speed of the load changing means based on a signal from the vehicle state sensing means. In this case, control changing the ground contact load of each wheel can be performed with good timing. For example, when changing to an oversteering tendency, the operating speed of the load changing means can be slowed (to slowly change the ground contact load) to restrain uncontrolled behavior. In addition, when changing to an understeering tendency, the speed of operation of the load changing means can be increased (to rapidly change the ground contact load) and safety can be increased.

In this case, as the vehicle speed sensed by the vehicle speed sensing means of the vehicle stating sensing means increases, the operating speed determined by the operating speed determining means can be made to decrease. In this case, the higher the speed, the more slowly the ground contact load can be made to change, and uncontrolled behavior can be reduced.

In this case, the vehicle state sensing means may comprise a gear ratio obtaining means which obtains the gear ratio of the variable gear ratio steering (VGRS) mechanism, and the operating speed determined by the operating speed determining means can be made to decrease as the gear ratio obtained by the gear ratio obtaining means increases. In this case, when the gear ratio of the VGRS mechanism is small, an oversteering tendency is produced, and the effectiveness of steering can be increased. In addition, when the gear ratio of the VGRS mechanism is large, an understeering tendency is produced, the effectiveness of steering can be reduced, and the safety of the vehicle can be increased by the VGRS mechanism.

When carrying out the present invention, the control means may comprise an allowing means which allows operating control by the load changing means at higher than a prescribed vehicle speed. In this case, operating control of the load changing means can be allowed only at the time of higher than a prescribed vehicle speed (such as around 6 km/hr, which is a vehicle speed at which a change in the ground contact load is effective), and at the time of a vehicle speed less than or equal to the prescribed speed, the load changing means is not operated, unnecessary operation is eliminated, and energy consumption can be suppressed, and an increase in the durability of the apparatus can be achieved.

When carrying out the present invention, the control means may comprise an initializing means which during travel straight ahead initializes sensors which sense the operating state of actuators. In this case, center shifts of sensors which sense the operating state of the actuators can be prevented.

When carrying out the present invention, front and rear, left and right load bearing means which support the ground contact load of the front and rear, left and right wheels may comprise front and rear, left and right suspension hydraulic cylinders having a single port and mounted on a corresponding one of the front and rear, left and right wheels, and the load changing means which operates to change the ground contact load supported by the suspension hydraulic cylinders may comprise a first ground contact load control hydraulic cylinder which receives the hydraulic pressure from each of the suspension hydraulic cylinders mounted on the left and right front wheels and is operated by the pressure difference, another ground contact load control hydraulic cylinder which receives the hydraulic pressure from each the suspension hydraulic cylinders mounted on the left and right rear wheels and is operated by the pressure difference, an axial force ratio varying mechanism which can vary the ratio of the axial force acting on each piston rod of the ground contact load control hydraulic cylinders by changing the position of a support point of an arm connecting both piston rods, and an actuator which can change the position of the support point of the arm based on a signal from the vehicle state sensing means.

In this case, by changing the position of the support point of the arm by the actuator, the ratio of the axial force acting on each piston rod of both ground contact load control hydraulic cylinders can be varied. Therefore, the rolling stiffness and rolling attenuation distribution ratios for the front and rear wheels can be suitably varied. In addition, this is control of displacement and not control of force, so control is easy, and the rolling stiffness distribution ratio for the front and rear wheels can be maintained just by maintaining and holding the actuator, so energy is not consumed, and each ground contact load control hydraulic cylinder can freely move during control, so the amount of input of road surface vibrations to the vehicle body can be decreased, and effects such as a good ride comfort can be expected.

When carrying out the present invention, a road surface $\mu$ estimating means which estimates the coefficient of friction of the road surface contacted by the left and right wheels at the time of braking can be provided, and a correcting means which controls the operation of the load changing means based on the coefficient of friction of each road surface obtained by the road surface $\mu$ estimating means and increases the ground contact load of the front wheel on the high $\mu$ side and the rear wheel on the low $\mu$ side and decreases the ground contact load of the front wheel on the low $\mu$ side and the rear wheel on the high $\mu$ side can be provided. In this case, during ABS control in which the left and right front wheels are independently controlled and the left and right rear wheels are controlled together, the braking force of the three wheels other than the front wheel on a low $\mu$ road surface is increased, and the braking distance can be shortened.

When carrying out the present invention, the vehicle state sensing means may comprise a vehicle speed sensing means which senses the vehicle speed and a steering angle sensor which senses the steering angle and a yaw rate sensor which senses the yaw rate, and the control means may comprise a yaw rate estimating means which estimates a target yaw rate based on the vehicle speed sensed by the vehicle speed sensing means and the steering angle sensed by the steering angle sensor, a yaw rate comparing means which compares the target yaw rate estimated by the yaw rate estimating means and the actual yaw rate sensed by the yaw rate sensor, and an operation correction amount determining means which determines an operation correction amount of the load changing means based on the difference between the target yaw rate and the actual yaw rate. In this case, the steering characteristics can be suitably corrected (specifically, when the actual yaw rate is inadequate, an oversteering tendency can be provided, and when the actual yaw rate is too large, and understeering tendency can be provided).

BRIEF DESCRIPTION OF THE DRAWINGS

FIGS. 16A, 16B, and 16C are explanatory views showing the operation when control of the ground contact load is carried out in the first embodiment when the vehicle is turning to the right.

FIGS. 17A, 17B, and 17C are explanatory views showing the operation when control of the ground contact load is performed in the first embodiment when the vehicle is turning to the left.

BEST MODE FOR CARRYING OUT THE INVENTION

Figure 1:
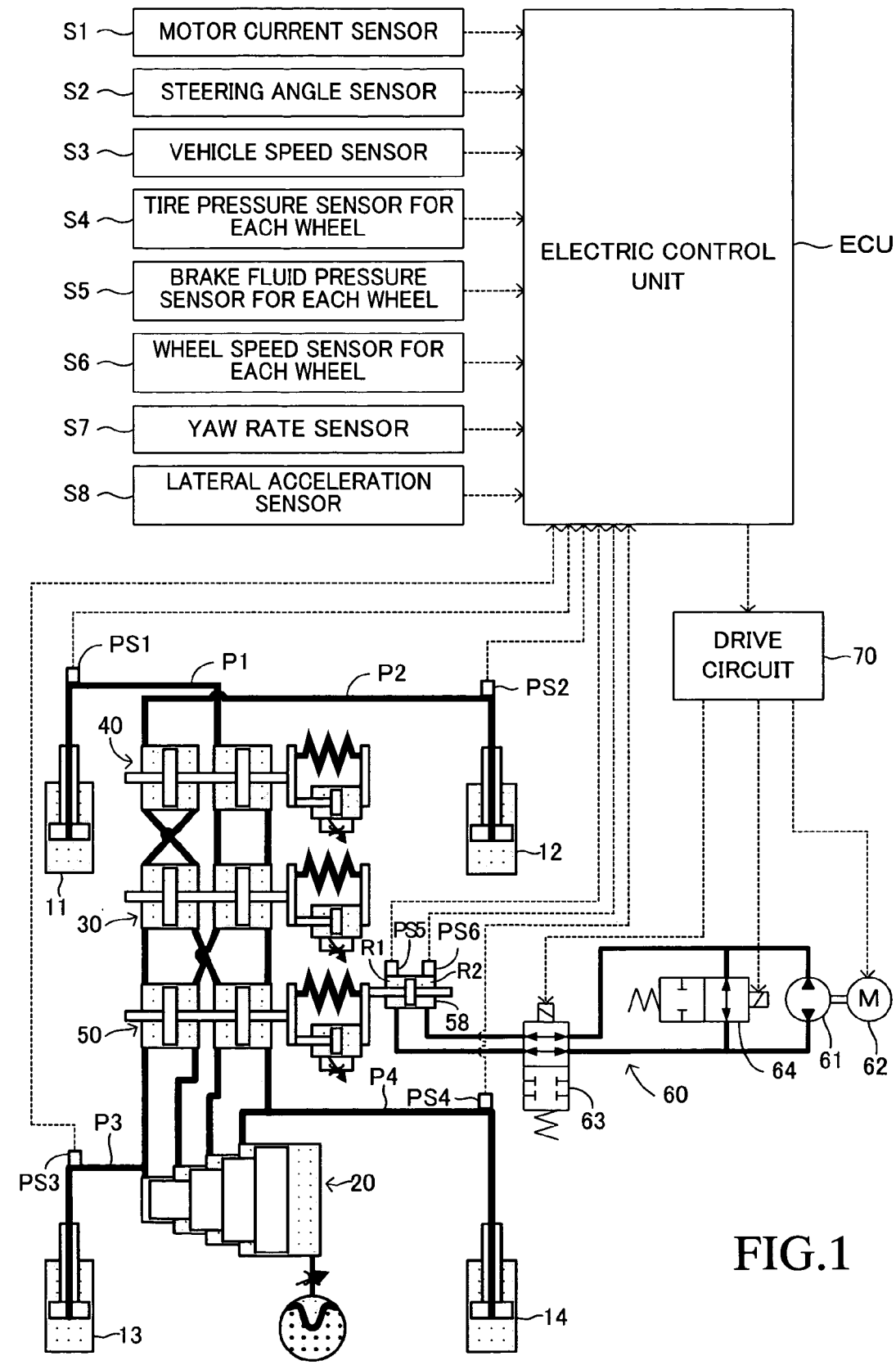
FIG. 1 is a view schematically showing the structure of a first embodiment of a vehicle suspension apparatus including a ground contact load control apparatus for a vehicle according to the present invention.
Figure 2:
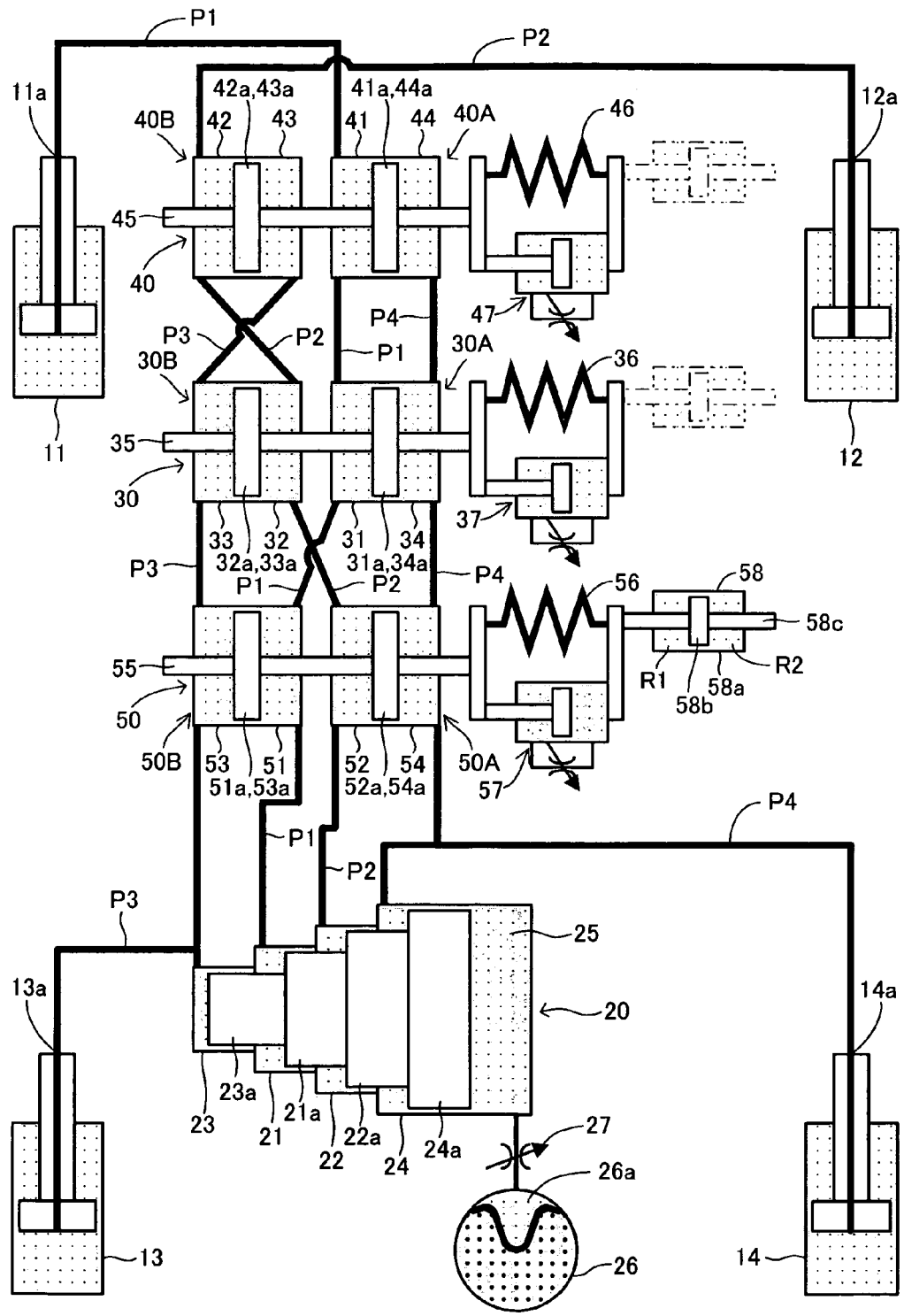
FIG. 2 is an enlarged view of the mechanical system shown in FIG.

Below, embodiments of the present invention will be explained based on the drawings. FIG. 1 schematically shows a first embodiment of a vehicle suspension apparatus including a vehicle ground contact load control apparatus according to the present invention. In this suspension apparatus, as shown in FIG. 1 and FIG. 2, suspension hydraulic cylinders 11, 12, 13, and 14 are each connected by pipes P1, P2, P3, and P4, respectively, to a bouncing suppressor 20, a rolling suppressor 30, a pitching suppressor 40, and a ground contact load changing apparatus 50.

Figure 14:
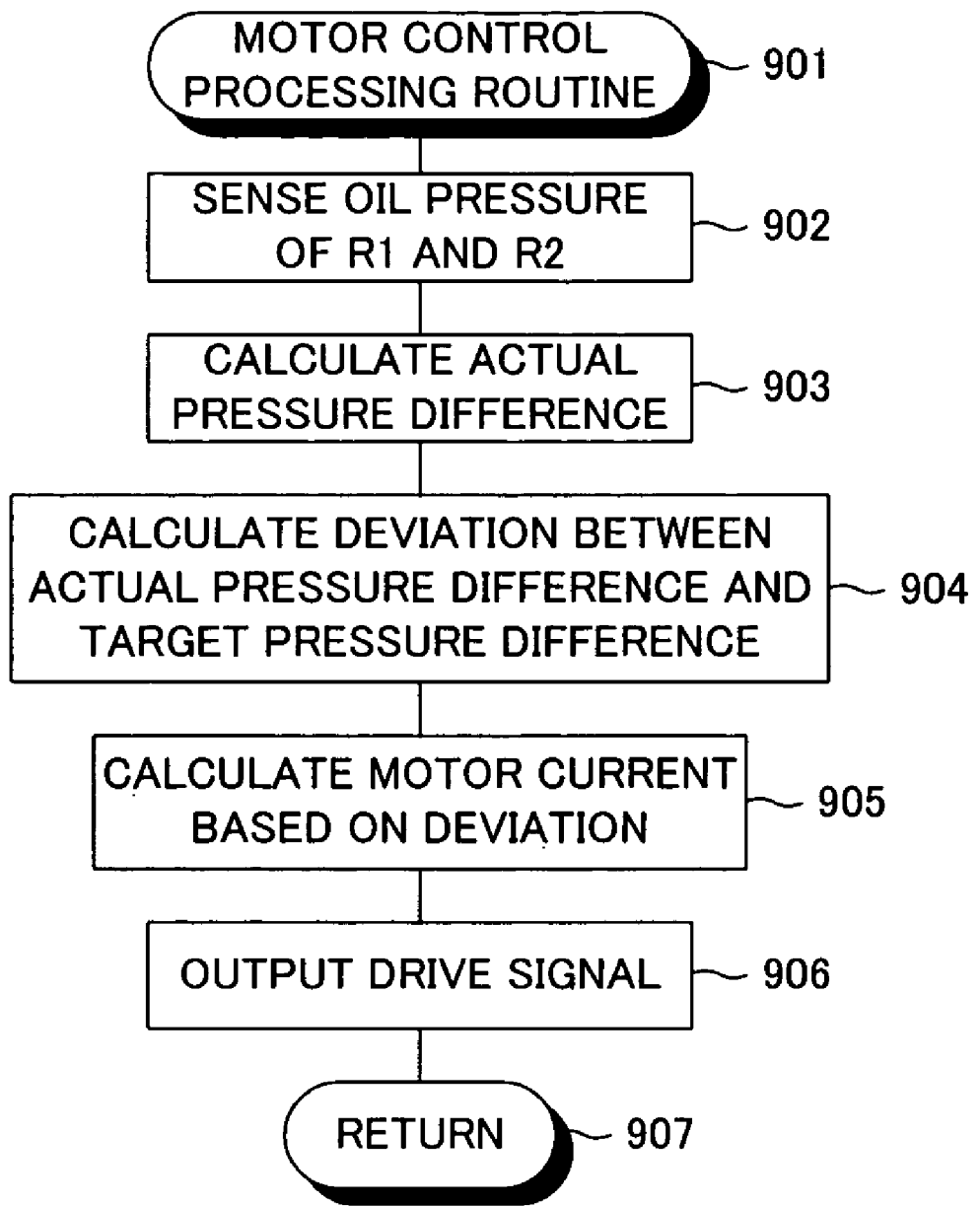
FIG. 14 is a flow chart showing a subroutine executed in Step 900 of FIG. 3.

The suspension hydraulic cylinders 11, 12, 13, and 14 are each mounted on a respective one of the front and rear, left and right wheels (see FL, FR, RL, and RR in FIG. 14). Each one has a single port 11a, 12a, 13a, or 14a. They support the ground contact load of the front and rear, left and right wheels FL, FR, RL, and RR, respectively. As shown in FIG. 1, hydraulic pressure sensors PS1, PS2, PS3, and PS4 are installed on the suspension hydraulic cylinders 11, 12, 13, and 14 for sensing their internal pressures. Each of the hydraulic pressure sensors PS1, PS2, PS3, and PS4 is electrically connected to an electric control unit ECU.

The bouncing suppressor 20 is a behavior restraining means for restraining the operation of each of the suspension hydraulic cylinders 11, 12, 13, and 14 in a state in which bouncing, which is one type of behavior of the vehicle body, is taking place. It comprises bouncing control cylinders 21, 22, 23, and 24 which are connected to the ports 11a, 12a, 13a, and 14a of the suspension hydraulic cylinders 11, 12, 13, and 14 by pipes P1, P2, P3, and P4, respectively. Each bouncing control cylinder 21, 22, 23, or 24 has a piston 21a, 22a, 23a, or 24a having approximately the same pressure receiving area.

Pistons 21a, 22a, 23a, and 24a are formed as a single body, and a hydraulic pressure chamber 25 is provided on their rear side. The hydraulic pressure chamber 25 is connected to a hydraulic pressure chamber 26a of an accumulator 26 (which can be a gas type or a spring type), which functions as a spring element. A variable aperture 27 which functions as a damping element for damping vibrations of the spring element is provided in a connecting passage between the hydraulic pressure chamber 25 and the hydraulic pressure chamber 26a.

The rolling suppressor 30 is a behavior restraining means for restraining the operation of each of the suspension hydraulic cylinders 11, 12, 13, and 14 in a state in which rolling, which is one type of behavior of the vehicle body, is taking place. It comprises rolling control cylinders 31, 32, 33, and 34 which are connected to ports 11a, 12a, 13a, and 14a of the suspension hydraulic cylinders 11, 12, 13, and 14 by pipes P1, P2, P3, and P4, respectively. Each rolling control cylinder 31, 32, 33, or 34 has a piston 31a, 32a, 33a, or 34a having approximately the same pressure receiving area.

Rolling control cylinders 31 and 34 are connected to diagonally opposed (left front and right rear) suspension hydraulic cylinders 11 and 14 and are connected so as to operate in opposite phase from each other (the directions of operation of pistons 31*a* and 34*a* accompanying an increase or decrease in hydraulic pressure are opposite from each other). They form a left and right pair of rolling control cylinders 30A. In the left and right pair of rolling control cylinders 30A, the pistons 31*a* and 34*a* of rolling control cylinders 31 and 34 are integral with each other and commonly used.

Rolling control cylinders 32 and 33 are connected to diagonally opposed (right front and left rear) suspension hydraulic cylinders 12 and 13, and they are connected so as to operate in opposite phase from each other. They form a left and right pair of rolling control cylinders 30B. In the left and right pair of rolling control cylinders 30B, the pistons 32*a* and 33*a* of rolling control cylinders 32 and 33 are integral with each other and commonly used.

The left and right pairs of rolling control cylinders 30A and 30B are disposed so as to move to the left and right in phase with each other (for example, when the hydraulic pressure in both of the lefthand suspension hydraulic cylinders 11 and 13 increases, pistons 31*a*, 34*a* and 32*a*, 33*a* are pushed to the right in the figure). Pistons 31*a*, 34*a*, and 32*a*, 33*a* are connected by a connecting rod 35.

The connecting rod 35 extends to outside of the cylinders. The extending end portion is connected to one end of a coil spring 36 which functions as a spring element and to one end of a shock absorber 37 which functions as a damping element for damping vibrations of the spring element. Its operation (movement in the axial direction) is restrained by the coil spring 36 and the shock absorber 37. In this embodiment, the other ends of the coil spring 36 and the shock absorber 37 are fixed so as not to move.

The pitching suppressor 40 is a behavior restraining means which restrains the operation of the suspension hydraulic cylinders 11, 12, 13, and 14 in a state in which pitching (which is one type of behavior of the vehicle body) is occurring. It comprises pitching control cylinders 41, 42, 43, and 44 which are connected to ports 11*a*, 12*a*, 13*a*, and 14*a* of the suspension hydraulic cylinders 11, 12, 13, and 14 by pipes P1, P2, P3, and P4, respectively. The pitching control cylinders 41, 42, 43, and 44 have pistons 41*a*, 42*a*, 43*a*, and 44*a*, having approximately the same pressure receiving area.

Pitching control cylinders 41 and 44 are connected to diagonally opposed (left front and right rear) suspension hydraulic cylinders 11 and 14 and are connected so as to operate in opposite phase from each other. They form a front and rear pair of pitching control cylinders 40A. In the front and rear pair of pitching control cylinders 40A, the pistons 41*a* and 44*a* of pitching control cylinders 41 and 44 are integral with each other and commonly used.

Pitching control cylinders 42 and 43 are connected to diagonally opposed (right front and left rear) suspension hydraulic cylinders 12 and 13 and are connected so as to operate in opposite phase from each other. They form a front and rear pair of pitching cylinders 40B. In the front and rear pair of pitching control cylinders 40B, the pistons 42*a* and 43*a* of pitching control cylinders 42 and 43 are integral with each other and commonly used.

The front and rear pairs of pitching control cylinders 40A and 40B are installed so as to be in the same phase in the fore and aft direction (for example, when the hydraulic pressure in both of the front suspension hydraulic cylinders 11 and 12 increases, pistons 41*a*, 44*a* and 42*a*, 43*a* are all pressed to the right in the figure). Pistons 41*a*, 44*a* and 42*a*, 43*a* are connected by a connecting rod 45.

Connecting rod 45 extends to outside of the cylinders. The extending end portion is connected to one end of a coil spring 46 which functions as a spring element and to one end of a shock absorber 47 which functions as a damping element for damping vibrations of the spring element. Its operation (movement in the axial direction) is restrained by coil spring 46 and shock absorber 47. In this embodiment, the other ends of coil spring 46 and shock absorber 47 are fixed so as to be unable to move.

The operation of the ground contact load changing apparatus 50 is controlled by the electric control unit ECU. It changes the ground contact load which is supported by the suspension hydraulic cylinders 11, 12, 13, and 14. It comprises ground contact load control cylinders 51, 52, 53, and 54 which are connected to the ports 11*a*, 12*a*, 13*a*, and 14*a* of the suspension hydraulic cylinders 11, 12, 13, and 14 by pipes P1, P2, P3, and P4, respectively. The ground contact load control cylinders 51, 52, 53, and 54 have pistons 51*a*, 52*a*, 53*a*, and 54*a*, having approximately the same pressure receiving area.

Each of ground contact load control cylinders 52 and 54 is connected to the suspension hydraulic cylinders 12 and 14 positioned on the right side (right front and right rear), and they are linked so as to operate in opposite phase from each other. They constitute a right pair of ground contact load control cylinders 50A. In the right pair of ground contact load control cylinders 50A, the pistons 52*a* and 54*a* of ground contact load control cylinders 52 and 54 are integral with each other and commonly used.

Each of ground contact load control cylinders 51 and 53 is connected to the suspension hydraulic cylinders 11 and 13 positioned on the left side (left front and left rear), and they are linked so as to operate in opposite phase from each other. They constitute a left pair of ground contact load control cylinders 50B. In the left pair of ground contact load control cylinders 50B, the pistons 51*a* and 53*a* of ground contact load control cylinders 51 and 53 are integral with each other and commonly used.

The right pair of ground contact load control cylinders 50A and the left pair of ground contact load control cylinders 50B are installed such that diagonally opposed ones are in phase with each other (for example, when the hydraulic pressures of the right front suspension hydraulic cylinder 12 and the left rear suspension hydraulic cylinder 13 both increase, pistons 51*a*, 53*a* and 52*a*, 54*a* are all pressed to the right in the figure). Pistons 51*a*, 53*a* and 52*a*, 54*a* are connected by a connecting rod 55.

Connecting rod 55 extends to outside of the cylinders. The extending end portion is connected to one end of a coil spring 56 which functions as a spring element and to one end of a shock absorber 57 which functions as a damping element for damping vibrations of the spring element. Its operation (movement in the axial direction) is restrained by coil spring 56 and shock absorber 57. Its operation (movement in the axial direction) is restrained by an actuator 58 connected to the other ends of coil spring 56 and shock absorber 57.

The actuator 58 imparts an operating force to each of the ground contact load control cylinders 51-54 through coil spring 56 and shock absorber 57. Its operation is controlled by a hydraulic pressure control apparatus 60. The actuator 58 is constituted by a cylinder 58*a* for which the supply and discharge of operating fluid is controlled by the hydraulic pressure control apparatus 60, a piston 58*b* which is installed inside the cylinder 58*a* so as to be able to reciprocate, and a rod 58*c* which passes through the cylinder 58*a* and moves as a single body with the piston 58*b* and which imparts an operating force to the other ends of coil spring 56 and shock absorber 57. A pair of oil chambers R1 and R2 are formed inside the cylinder 58*a* by the piston 58*b*. Hydraulic pressure sensors PS5 and PS6 which sense the pressure in the oil chambers R1 and R2 are installed in cylinder 58*a*. Each of the hydraulic pressure sensors PS5 and PS6 is electrically connected to the electric control unit ECU.

The hydraulic pressure control apparatus 60 comprises a reversible rotating pump 61 which can supply working fluid to each of the oil chambers R1 and R2 of the actuator 58, an electric motor 62 which can reversibly rotate to drive the pump 61, a four-port two-position switching valve 63 which is disposed in a connecting passage between the oil chambers R1 and R2 and the pump 61 and can permit or cut off communication between the two, and a two-port two-position on-off valve 64 which is disposed in a bypass passage connecting both ports of the pump 61 and which can open and close the bypass passage. In this hydraulic pressure control apparatus 60, the operation of the electric motor 62, the four-port two-position switching valve 63, the two-port two-position on-off valve 64, and the like is controlled by the electric control unit ECU through a drive circuit 70.

The electric control unit ECU is electrically connected to each of the hydraulic pressure sensors PS1-PS6 and to the drive circuit 70. It is also electrically connected to a motor current sensor S1, a steering angle sensor S2, a vehicle speed sensor S3, a tire pressure sensor S4 for each wheel, a brake fluid pressure sensor S5 for each wheel, a wheel speed sensor S6 for each wheel, a yaw rate sensor S7, a lateral acceleration sensor S8, and the like.

The electric control unit ECU comprises a microcomputer having a CPU, a ROM, a RAM, an interface, and the like. When an ignition switch (not shown) is in an ON state, the CPU of the electric control unit ECU repeatedly performs a control program corresponding to the flow charts shown in FIGS. 3-13 at prescribed intervals (such as every 8 msec), and it controls the operation of the electric motor 62, the four-port two-position switching valve 63, the two-port two-position on-off valve 64, and the like in the hydraulic pressure control apparatus 60.

The electric control unit ECU outputs a VSC control signal during VSC control by a conventional VSC apparatus (vehicle stability control apparatus) which suppresses understeering and oversteering when the vehicle is turning. The electric control unit ECU is constituted so as to be able to control the operation of a known variable gear ratio steering (VGRS) mechanism which can vary the steering gear ratio in accordance with the vehicle speed.

In this first embodiment of a vehicle suspension apparatus constituted as described above, when the ignition switch is turned to an ON state, based on the signals from each of the sensors, the CPU of the electric control unit ECU controls the operation of the electric motor 62, the four-port two-position switching valve 63, and the two-port two-position on-off valve 64 of the hydraulic pressure control apparatus 60, and controls the ground contact load of the front and rear, left and right wheels FL, FR, RL, and RR.

Figure 3:
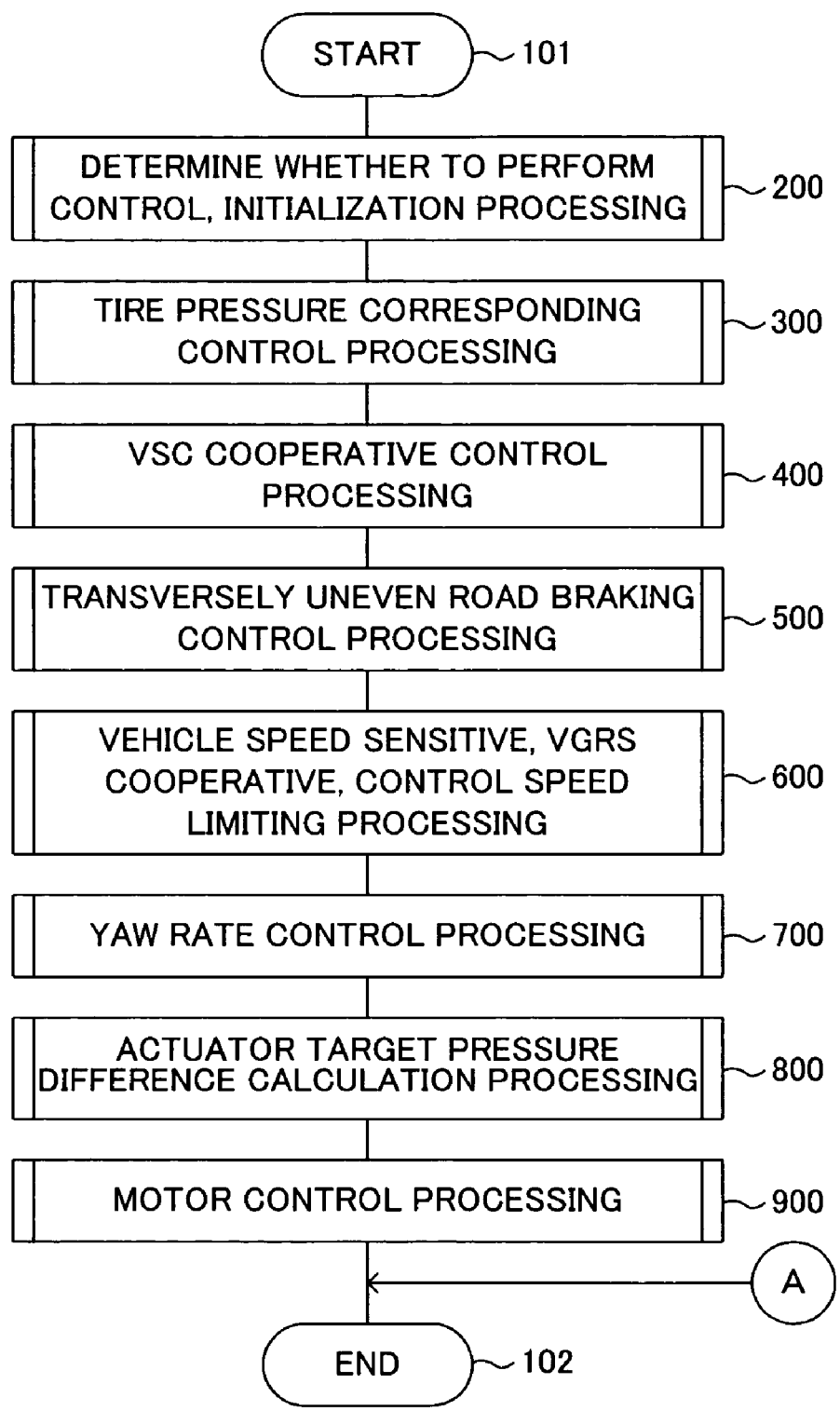
FIG. 3 is a flow chart of a main routine executed by the CPU of the electric control unit shown in FIG. 1.

This control of the ground contact load is carried out by the repeated execution by the CPU of the electric control unit ECU of the main routine shown in FIG. 3 at prescribed intervals (such as every 8 msec). The CPU of the electric control unit ECU begins processing with Step 101 of FIG. 3. In Step 200, it makes a determination of whether to carry out control and performs initialization processing. In Step 300, it performs tire pressure corresponding control processing. In Step 400, it performs VSC cooperative control processing. In Step 500, it carries out transversely uneven road braking control processing. In Step 600, it carries out vehicle speed sensitive—VGRS cooperative—control speed limiting processing. In Step 700, it performs yaw rate control processing. In Step 800, it performs actuator target pressure difference calculation processing. In Step 900, it performs motor control processing. In Step 102, processing temporarily ends.

Figure 4:
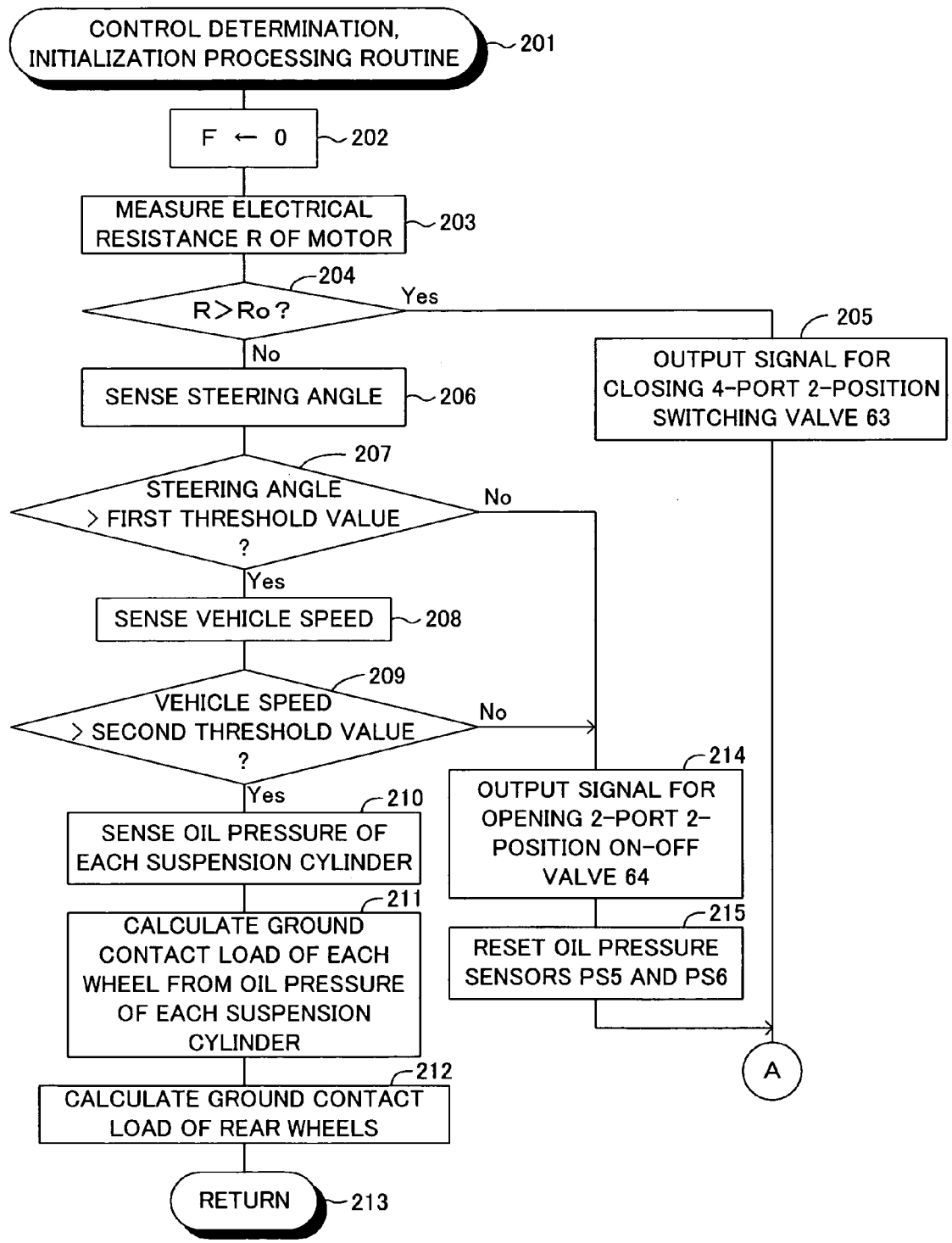
FIG. 4 is a flow chart showing a subroutine executed in Step 200 of FIG. 3.

When the CPU of the electric control unit ECU carries out a determination of whether to perform control and initialization processing in Step 200 of FIG. 3, it executes the subroutine shown in FIG. 4. Specifically, the CPU of the electric control unit ECU begins processing in Step 201. In Step 202, it sets flag F to 0, and in Step 203, it measures and stores the electrical resistance R of the electric motor 62. This electrical resistance R is measured based on the signal from the motor current sensor S1 when a minute current is passed through the electric motor 62. When the electric motor 62 has a wire breakage and is not conducting, the electrical resistance is greater than a set value Ro.

Therefore, when the electric motor 62 has a wire breakage (at the time of a failure), the CPU of the electric control unit ECU makes a determination of Yes in Step 204, in Step 205 it outputs a close signal to the drive circuit 70 which puts the four-port two-position switching valve 63 into a closed state, and then it returns to Step 102 of FIG. 1, and in Step 102, processing temporarily ends. Accordingly, when electric motor 62 has a wire breakage and the operation of the actuator 58 cannot be controlled by the hydraulic pressure control apparatus 60, the actuator 58 is hydraulically locked by the four-port two-position switching valve 63 and its operation is prevented.

On the other hand, when the electric motor 62 does not have a wire breakage, the CPU of the electric control unit ECU makes a determination of No in Step 204, and in Step 206, it senses and stores the steering angle from the signal of the steering angle sensor S2. At this time, if the steering angle is greater than a first threshold value (such as about 3 degrees), a determination of Yes is made in Step 207, and in Step 208, the vehicle speed is sensed from the signal of the vehicle speed sensor S3 and stored. At this time, if the vehicle speed is greater than a second threshold value (such as around 6 km/hr), a determination of Yes is made in Step 209, and Steps 210, 211, and 212 are performed, and then Step 213 is performed and the main routine of FIG. 3 is returned to.

If the steering angle is less than or equal to the first threshold value at the time of carrying out above-described Step 207 (a state in which the vehicle is moving substantially straight ahead), the CPU of the electric control unit ECU makes a determination of No in Step 207, and after carrying out Steps 214 and 215, it returns to Step 102 of FIG. 3, and in Step 102, processing temporarily ends. If the vehicle speed is less than or equal to the second threshold value at the time of carrying out above-described Step 209 (a speed less than or equal to that at which changing the ground contact load is effective), the CPU of the electric control unit ECU makes a determination of No in Step 209, and after performing Steps 214 and 215, it returns to Step 102 of FIG. 3, and in Step 102, processing temporarily ends.

In Step 210, the CPU of the electric control unit ECU senses and stores the suspension cylinder hydraulic pressure from the signals of the hydraulic pressure sensors PS1, PS2, PS3, and PS4 provided on the suspension hydraulic cylinders 11, 12, 13, 14. In Step 211, it calculates and stores the ground contact load of each wheel from the suspension cylinder hydraulic pressure. In Step 212, it calculates and stores the ground contact load of the rear wheels from the right rear wheel ground contact load and the left rear wheel ground contact load of the ground contact loads for all of the wheels. The ground contact load of each wheel in Step 211 is calculated by multiplying suspension cylinder hydraulic pressures by the pressure receiving area of the suspension hydraulic cylinders 11, 12, 13, and 14. The rear wheel ground contact load in Step 212 is calculated by adding the right rear wheel ground contact load and the left rear wheel ground contact load.

In Step 214, the CPU of the electric control unit ECU outputs to the drive circuit 70 an open signal for opening the two-port two-position on-off valve 64. In Step 215, the hydraulic pressure sensors PS5 and PS6 provided on the cylinder 58a of the actuator 58 are reset and initialized. Therefore, at this time, the bypass passage connecting both ports of the pump 61 is opened, and free operation of piston 58b and rod 58c in the actuator 58 is permitted. Accordingly, at this time, free operation of the ground contact load control cylinders 51-54 is permitted, the transmission of vibrations from the road surface is cut off, and the ride comfort can be increased.

In Step 215, hydraulic pressure sensors PS5 and PS6 are reset and initialized, so center shifts of the hydraulic pressure sensors PS5 and PS6 can be prevented. In the execution of Steps 208 and 209, when the vehicle speed is less than or equal to the second threshold value (when the effect of changing the ground contact load cannot be effectively obtained), Steps 300-900 of FIG. 3 are not performed, unnecessary operation is eliminated, energy consumption can be suppressed, and an increase in the durability of the apparatus can be achieved.

Figure 5:
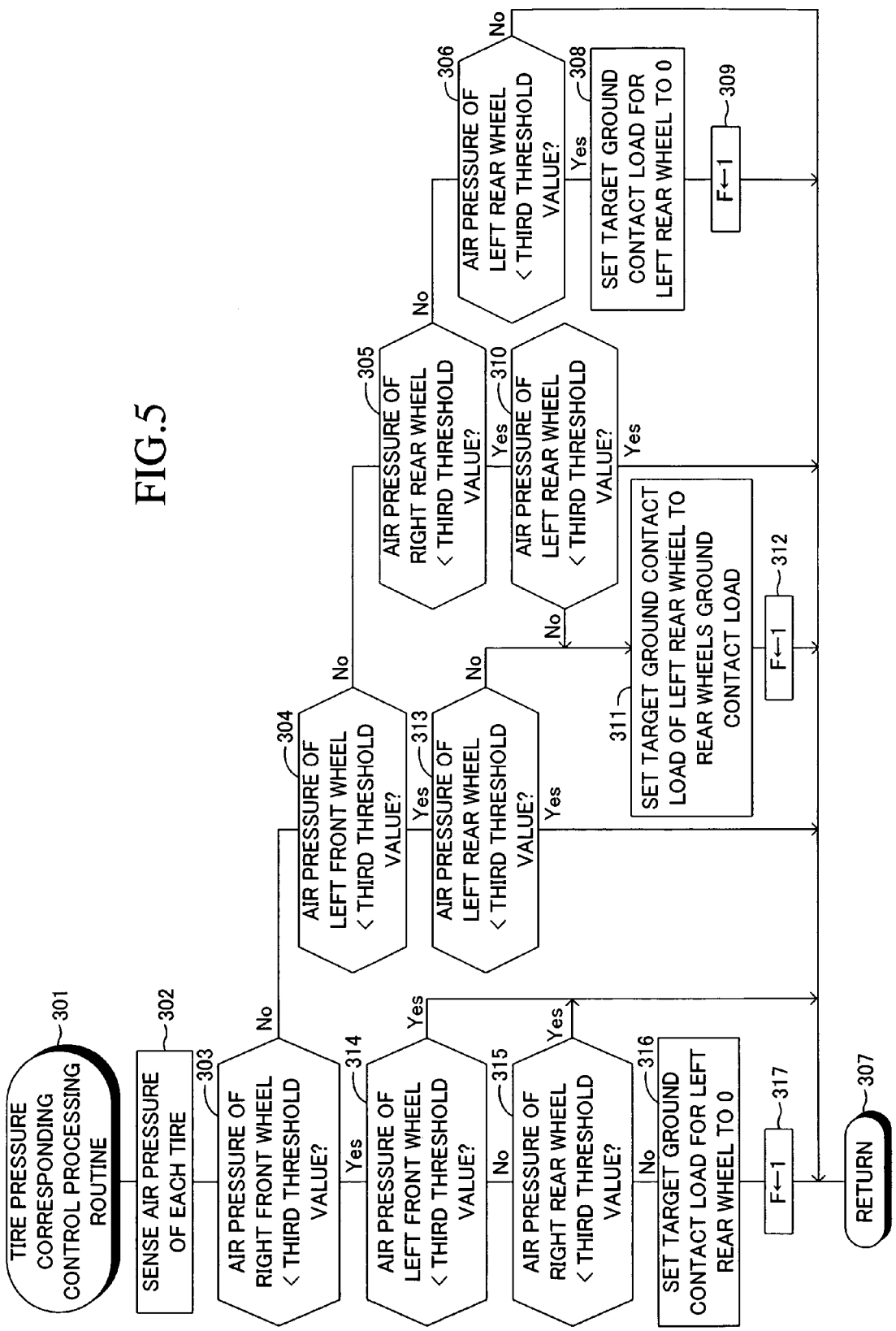
FIG. 5 is a flow chart showing a subroutine executed in Step 300 of FIG. 3.

When the CPU of the electric control unit ECU performs the tire pressure corresponding control processing in Step 300 of FIG. 3, it executes the subroutine shown in FIG. 5. Specifically, the CPU of the electric control unit ECU begins processing in Step 301. In Step 302, the tire pressure of each wheel is sensed from a signal of the tire pressure sensor S4 for each wheel and stored. At this time, if the tire pressure of each wheel is at least a third threshold value (for example, a normal lower limit of around 150 kPa), the CPU of the electric control unit ECU makes a determination of No in each of Steps 303, 304, 305, and 306, and then it performs Step 307 and returns to the main routine of FIG. 3.

At this time, if the tire pressure of each wheel other than the tire pressure of the left rear wheel is at least the third threshold value, the CPU of the electric control unit ECU makes a determination of No in each of Steps 303, 304, and 305 and makes a determination of Yes in Step 306. In Step 308, it sets the target ground contact load for the left rear wheel to 0, in Step 309 it sets flag F to 1, and then it performs Step 307 and returns to the main routine of FIG. 3.

At this time, if the tire pressures of the left and right front wheels are at least the third threshold value and the tire pressure of the left and right rear wheels are less than the third threshold value, the CPU of the electric control unit ECU makes a determination of No in Steps 303 and 304, it makes a determination of Yes in Steps 305 and 310, and then it performs Step 307 and returns to the main routine of FIG. 3.

At this time, if the tire pressure of each wheel other than the right rear wheel is at least the third threshold value, the CPU of the electric control unit ECU makes a determination of No in Steps 303 and 304, it makes a determination of Yes in Step 305, and it makes a determination of No in Step 310. In Step 311, it sets the target ground contact load for the left rear wheel to the ground contact load for both rear wheels (the ground contact load calculated in Step 212 of FIG. 4), in Step 312 it sets flag F to 1, and then it performs Step 307 and returns to the main routine of FIG. 3.

At this time, if the tire pressures of the right front wheel and the left rear wheel are at least the third threshold value and the tire pressure of the left front wheel is less than the third threshold value, the CPU of the electric control unit ECU makes a determination of No in Step 303, it makes a determination of Yes in Step 304, and it makes a determination of No in Step 313. In Step 311, it sets the target ground contact load for the left rear wheel to the above-described both rear wheels ground contact load, in Step 312 it sets flag F to 1, and then it performs Step 307 and returns to the main routine of FIG. 3.

At this time, if the tire pressure of the right front wheel is at least the third threshold value and the tire pressures of the left front wheel and the left rear wheel are less than the third threshold value, the CPU of the electric control unit ECU makes a determination of No in Step 303, it makes a determination of Yes in Steps 304 and 313, and then it performs Step 307 and returns to the main routine of FIG. 3.

At this time, if the tire pressures of the left and right front wheels are less than the third threshold value, the CPU of the electric control unit ECU makes a determination of Yes in Steps 303 and 314, and then it performs Step 307 and returns to the main routine of FIG. 3. At this time, if the tire pressure of the right front wheel is less than the third threshold value, the tire pressure of the left front wheel is at least the third threshold value, and the tire pressure of the right rear wheel is less than the third threshold value, the CPU of the electric control unit ECU makes a determination of Yes in Step 303, it makes a determination of No in Step 314, it makes a determination of Yes in Step 315, and then it performs Step 307 and returns to the main routine of FIG. 3.

At this time, if the tire pressure of the right front wheel is less than the third threshold value and the tire pressures of the left front wheel and the right front wheel are at least the third threshold value, the CPU of the electric control unit ECU makes a determination of Yes in Step 303, it makes a determination of No in Steps 314 and 315, it sets the target ground contact load for the left rear wheel to 0 in Step 316, it sets flag F to 1 in Step 317, and then it performs Step 307 and returns to the main routine of FIG. 3.

Figure 6:
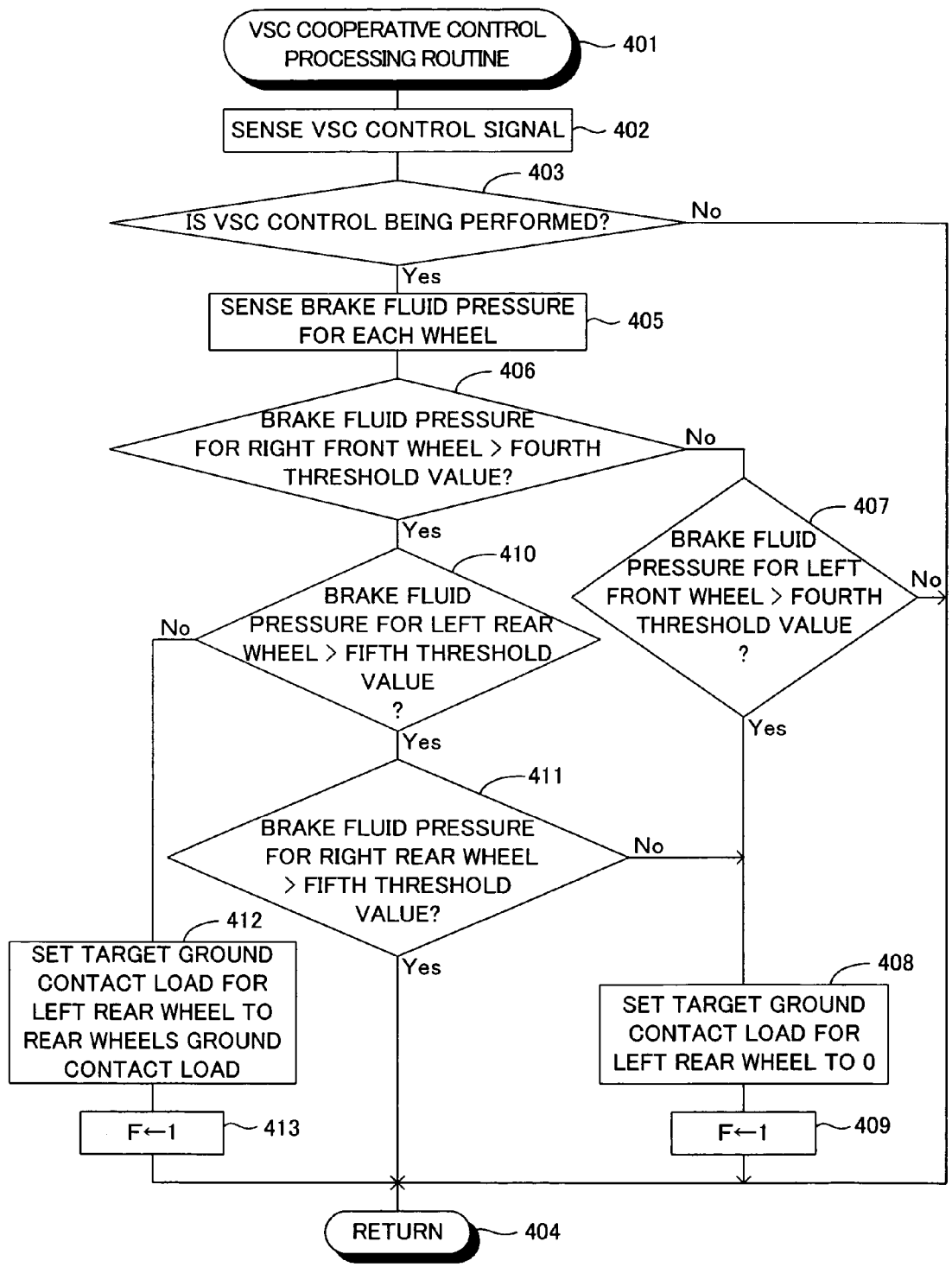
FIG. 6 is a flow chart showing a subroutine executed in Step 400 of FIG. 3.

When the CPU of the electric control unit ECU performs the VSC cooperative control processing of Step 400 of FIG. 3, it executes the subroutine shown in FIG. 6. Specifically, the CPU of the electric control unit ECU begins processing in Step 401. In Step 402, it senses and stores the VSC control signal (a signal which the electric control unit ECU itself outputs during VSC control). At this time, if VSC control is not being performed, the CPU of the electric control unit ECU makes a determination of No in Step 403, and then it performs Step 404 and returns to the main routine of FIG. 3. If VSC control is being performed, the CPU of the electric control unit ECU makes a determination of Yes in Step 403, and then in Step 405, it senses and stores the brake fluid pressure of each wheel from the signal from the brake fluid pressure sensor S5 for each wheel.

At this time, if the brake fluid pressures of the left and right front wheels is less than or equal to a fourth threshold value (such as around 1 MPa), the CPU of the electric control unit ECU makes a determination of No in Steps 406 and 407, and then it performs Step 404 and returns to the main routine of FIG. 3. At this time, if the brake fluid pressure of the right front wheel is less than or equal to the fourth threshold value and the brake fluid pressure of the left front wheel is greater than the fourth threshold value, the CPU of the electric control unit ECU makes a determination of No in Step 406, it makes a determination of Yes in Step 407, it sets the target ground contact load of the left rear wheel to 0 in Step 408, it sets flag F to 1 in Step 409, and then it performs Step 404 and returns to the main routine of FIG. 3.

At this time, if the brake fluid pressure of the right front wheel is greater than the fourth threshold value, the brake fluid pressure of the left rear wheel is greater than a fifth threshold value (such as about 0.5 MPa), and the brake fluid pressure of the right rear wheel is less than or equal to the fifth threshold value, the CPU of the electric control unit ECU makes a determination of Yes in Step 406, it makes a determination of Yes in Step 410, it makes a determination of No in Step 411, it sets the target ground contact load for the left rear wheel to 0 in Step 408, it sets flag F to 1 in Step 409, and then it performs Step 404 and returns to the main routine of FIG. 3.

At this time, if the brake fluid pressure of the right front wheel is greater than the fourth threshold value and the brake fluid pressures of the left and right rear wheels are greater than the fifth threshold value, the CPU of the electric control unit ECU makes a determination of Yes in each of Steps 406, 411, and 412, and then it performs Step 404 and returns to the main routine of FIG. 3.

At this time, if the brake fluid pressure of the right front wheel is greater than the fourth threshold value and the brake fluid pressure of the left rear wheel is less than or equal to the fifth threshold value, the CPU of the electric control unit ECU makes a determination of Yes in Step 406, it makes a determination of No in Step 410, it sets the target ground contact load for the left rear wheel to the above-described both rear wheels ground contact load in Step 412, it sets flag F to 1 in Step 413, and then it performs Step 404 and returns to the main routine of FIG. 3.

Figure 7:
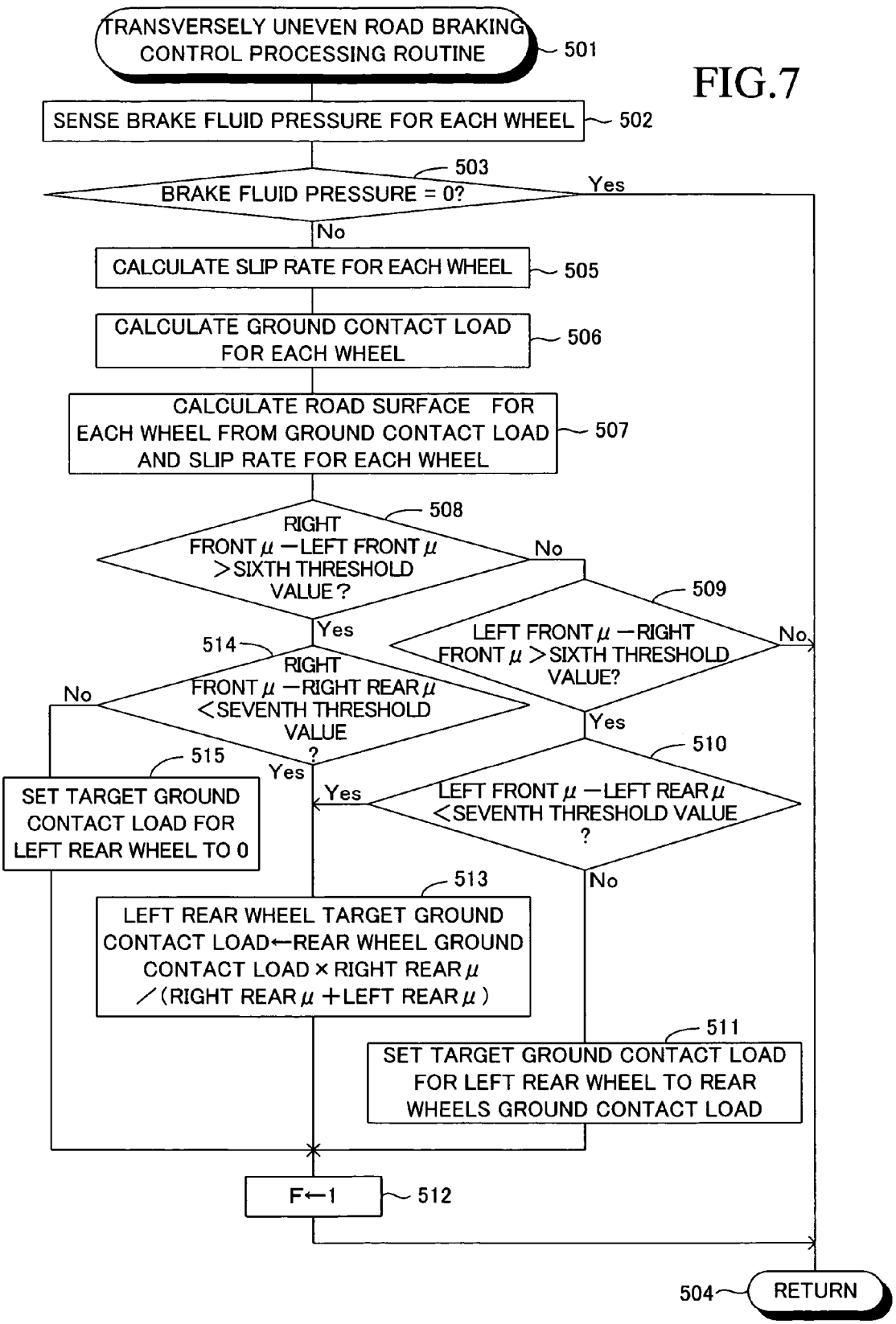
FIG. 7 is a flow chart showing a subroutine executed in Step 500 of FIG. 3.
Figure 8:
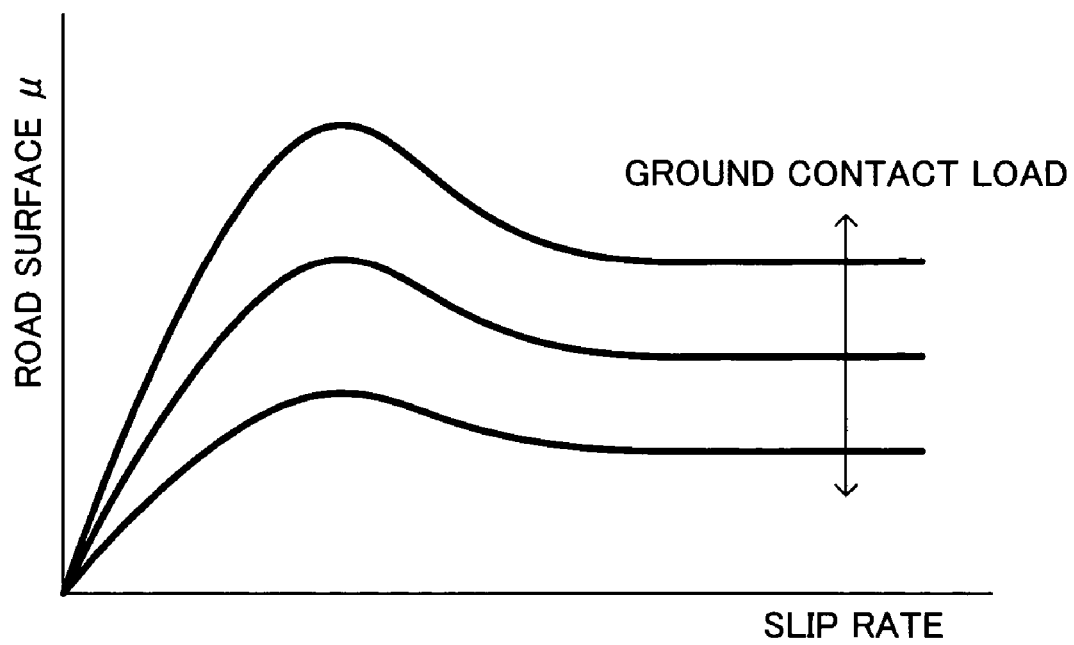
FIG. 8 is a map showing the relationship between the slip rate, the ground contact load, and the road surface μ.

In Step 500 of FIG. 3, when the CPU of the electric control unit ECU performs transversely uneven road braking control processing, it performs the subroutine shown in FIG. 7. Specifically, the CPU of the electric control unit ECU begins processing in Step 501. In Step 502, it senses and stores the brake fluid pressure of each wheel from the signal of the brake fluid pressure sensor S5 for each wheel (see FIG. 1). At this time, if all the brake fluid pressures are 0, the CPU of the electric control unit ECU makes a determination of Yes in Step 503, and then it performs Step 504 and returns to the main routine of FIG. 3.

If at least one brake fluid pressure is not 0, the CPU of the electric control unit ECU makes a determination of No in Step 503, and then in Step 505, it calculates and stores the slip rate for each wheel (slip rate for each wheel). In Step 506, it calculates and stores the ground contact load for each wheel (ground contact load for each wheel). In Step 507, it calculates and stores the coefficient of friction of the road surface contacted by each wheel (road surface μ for each wheel).

The above-mentioned slip rate for each wheel is calculated by the relational equation "slip rate=(vehicle speed−wheel speed)/vehicle speed" using the wheel speed obtained from the signal from the wheel speed sensor S6 for each wheel (see FIG. 1) and the vehicle speed obtained from the signal from the vehicle speed sensor S1 (see FIG. 1). The above-mentioned braking force for each wheel is calculated using the equation "braking force=brake fluid pressure×piston area× pad μ×effective brake radius/tire effective radius" using the brake fluid pressure for each wheel obtained from the signal from the brake fluid pressure sensor S5 for each wheel (see FIG. 1) and specifications (piston area, pad μ, effective brake radius, tire effective radius) of the brake apparatus mounted on each wheel. The above-mentioned ground contact load for each wheel is calculated by multiplying the pressure obtained from the signals from the hydraulic pressure sensors PS1-PS4 (see FIG. 1) provided on each of the suspension hydraulic cylinders 11-14 by the pressure receiving area of each of the suspension hydraulic cylinders 11-14. The above-mentioned road surface μ for each wheel is calculated from the slip rate for each wheel and the ground contact load for each wheel while referring to the map in FIG. 8.

When the road surface μ for each wheel is estimated and stored, if the difference between the coefficient of friction of the road surface contacted by the right front wheel (right front μ) and the coefficient of friction of the road surface contacted by the left front wheel (left front μ) is less than or equal to a sixth threshold value (such as around 0.1) and the difference between the coefficient of friction of the road surface contacted by the left front wheel (left front μ) and the coefficient of friction of the road surface contacted by the right front wheel (right front μ) is less than or equal to the sixth threshold value, the CPU of the electric control unit ECU makes a determination of No in Step 508, it makes a determination of No in Step 509, and then it executes Step 504 and returns to the main routine of FIG. 3.

At this time, if the difference between the coefficient of friction of the road surface contacted by the right front wheel (right front μ) and the coefficient of friction of the road surface contacted by the left front wheel (left front μ) is less than or equal to the sixth threshold value, the difference between the coefficient of friction of the road surface contacted by the left front wheel (left front μ) and the coefficient of friction of the road surface contacted by the right front wheel (right front μ) is greater than the sixth threshold value, and the difference between the coefficient of friction of the road surface contacted by the left front wheel (left front μ) and the coefficient of friction of the road surface contacted by the left rear wheel (left rear μ) is at least a seventh threshold value (such as around 0.1), the CPU of the electric control unit ECU makes a determination of No in Step 508, it makes a determination of Yes in Step 509, it makes a determination of No in Step 510, in Step 511 it sets the target ground contact load of the left rear wheel to the above-mentioned both rear wheels ground contact load, it sets flag F to 1 in Step 512, and then it performs Step 504 and returns to the main routine of FIG. 3.

At this time, if the difference between the coefficient of friction of the road surface contacted by the right front wheel (right front μ) and the coefficient of friction of the road surface contacted by the left front wheel (left front μ) is less than or equal to the sixth threshold value, the difference between the coefficient of friction of the road surface contacted by the left front wheel (left front μ) and the coefficient of friction of the road surface contacted by the right front wheel (right front μ) is greater than the sixth threshold value, and the difference between the coefficient of friction of the road surface contacted by the left front wheel (left front μ) and the coefficient of friction of the road surface contacted by the left rear wheel (left rear μ) is smaller than the seventh threshold value, the CPU of the electric control unit ECU makes a determination of No in Step 508, it makes a determination of Yes in Step 509, it makes a determination of Yes in Step 510, it sets the target ground contact load for the left rear wheel equal to the above-mentioned both rear wheels ground contact load×right rear μ/(right rear μ+left rear μ) in Step 513, it sets flag F to 1 in Step 512, and then it performs Step 504 and returns to the main routine of FIG. 3.

At this time, if the difference between the coefficient of friction of the road surface contacted by the right front wheel (right front μ) and the coefficient of friction of the road surface contacted by the left front wheel (left front μ) is greater than the sixth threshold value and the difference between the coefficient of friction of the road surface contacted by the right front wheel (right front μ) and the coefficient of friction of the road surface contacted by the right rear wheel (right rear μ) is smaller than the seventh threshold value, the CPU of the electric control unit ECU makes a determination of Yes in Step 508, it makes a determination of Yes in Step 514, it sets the target ground contact load for the left rear wheel equal to the both rear wheels ground contact load×right rear μ/(right rear μ+left rear μ) in Step 513, it sets flag F to 1 in Step 512, and then it performs Step 504 and returns to the main routine of FIG. 3.

At this time, if the difference between the coefficient of friction of the road surface contacted by the right front wheel (right front μ) and the coefficient of friction of the road surface contacted by the left front wheel (left front μ) is greater than the sixth threshold value and the difference between the coefficient of friction of the road surface contacted by the right front wheel (right front μ) and the coefficient of friction of the road surface contacted by the right rear wheel (right rear μ) is at least the seventh threshold value, the CPU of the electric control unit ECU makes a determination of Yes in Step 508, it makes a determination of No in Step 514, it sets the target ground contact load of the left rear wheel to 0 in Step 515, it sets flag F to 1 in Step 512, and then it performs Step 504 and returns to the main routine of FIG. 3.

Figure 9:
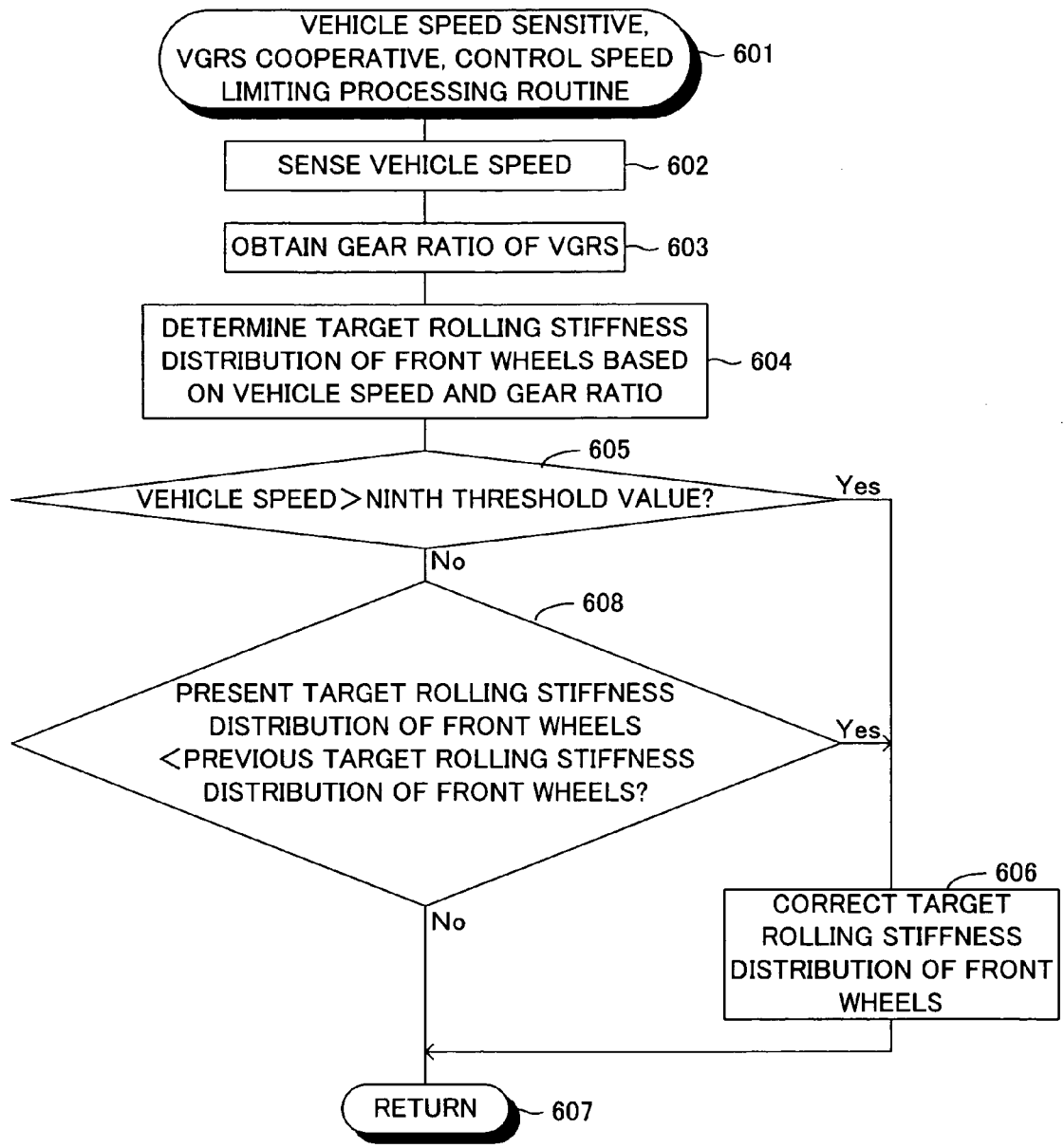
FIG. 9 is a flow chart showing a subroutine executed in Step 600 of FIG. 3.
Figure 10:
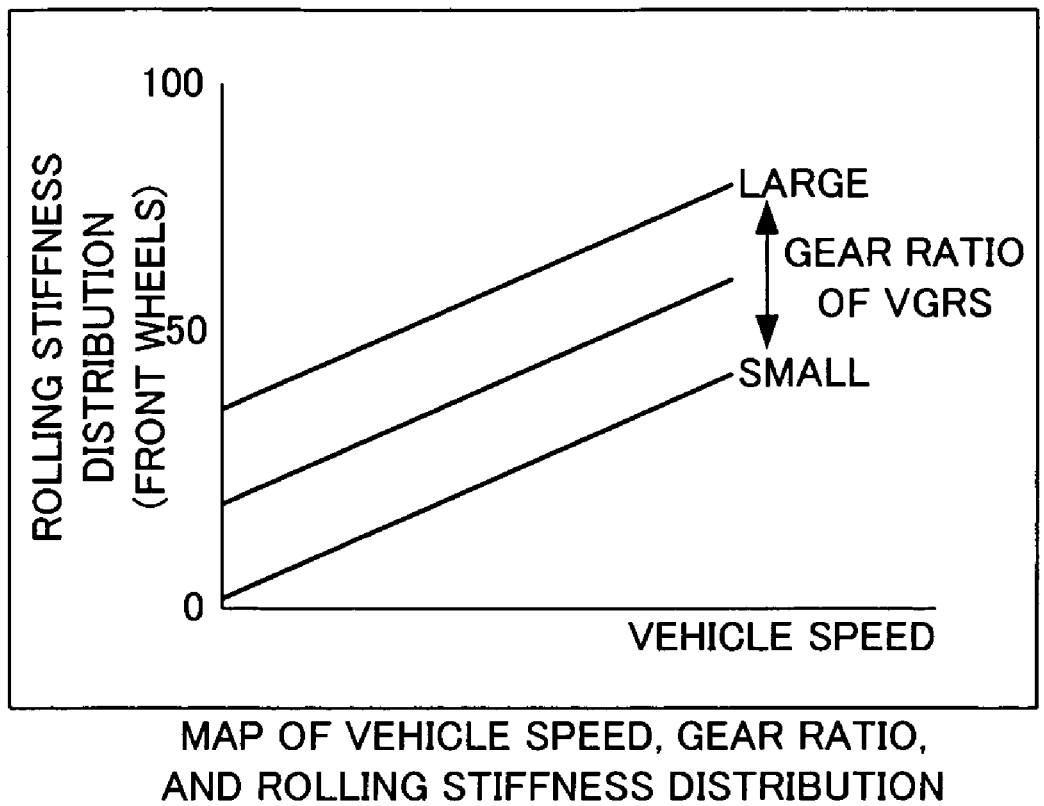
FIG. 10 is a map showing the relationship between the vehicle speed, the gear ratio, and the rolling stiffness distribution (front wheels).

When the CPU of the electric control unit ECU performs the vehicle speed sensitive—VGRS cooperative—control speed limiting processing of Step 600 of FIG. 3, it performs the subroutine shown in FIG. 9. Specifically, the CPU of the electric control unit ECU begins processing in Step 601. In Step 602, it senses and stores the vehicle speed from the signal from the vehicle speed sensor S3 (see FIG. 1), in Step 603 it obtains and stores the gear ratio of the VGRS mechanism based on the vehicle speed, and in Step 604, it determines and stores the target rolling stiffness distribution of the front wheels based on the above-mentioned vehicle speed and gear ratio of the VGRS mechanism by referring to the map in FIG. 10.

At this time, if the vehicle speed is greater than a ninth threshold value (such as around 60 km/hr), the CPU of the electric control unit ECU makes a determination of Yes in Step 605, in Step 606 it performs calculation correcting the target rolling stiffness distribution of the front wheels and stores the result, and then it performs Step 607 and returns to the main routine of FIG. 3. The calculation correcting the target rolling stiffness distribution of the front wheels in Step 606 is performed by adding the current target rolling stiffness distribution of the front wheels obtained when performing Step 604 and the previous target rolling stiffness distribution of the front wheels obtained when the previous time Step 604 was performed and then taking ½ thereof (by averaging the values).

At this time, if the vehicle speed is less than or equal to the ninth threshold value and the current target rolling stiffness distribution of the front wheels obtained when performing Step 604 is greater than or equal to the previous target rolling stiffness distribution of the front wheels obtained when the previous time Step 604 was performed, the CPU of the electric control unit ECU makes a determination of No in Step 605, it makes a determination of No in Step 608, and then it performs Step 607 and returns to the main routine of FIG. 3.

At this time, if the vehicle speed is less than or equal to the ninth threshold value and the current target rolling stiffness distribution of the front wheels obtained when performing Step 604 is smaller than the previous target rolling stiffness distribution of the front wheels obtained when the previous time Step 604 was performed, the CPU of the electric control unit ECU makes a determination of No in Step 605, it makes a determination of Yes in Step 608, in Step 606 it performs calculation correcting the current target rolling stiffness distribution of the front wheels and stores the result, and then it performs Step 607 and returns to the main routine of FIG. 3.

Figure 11:
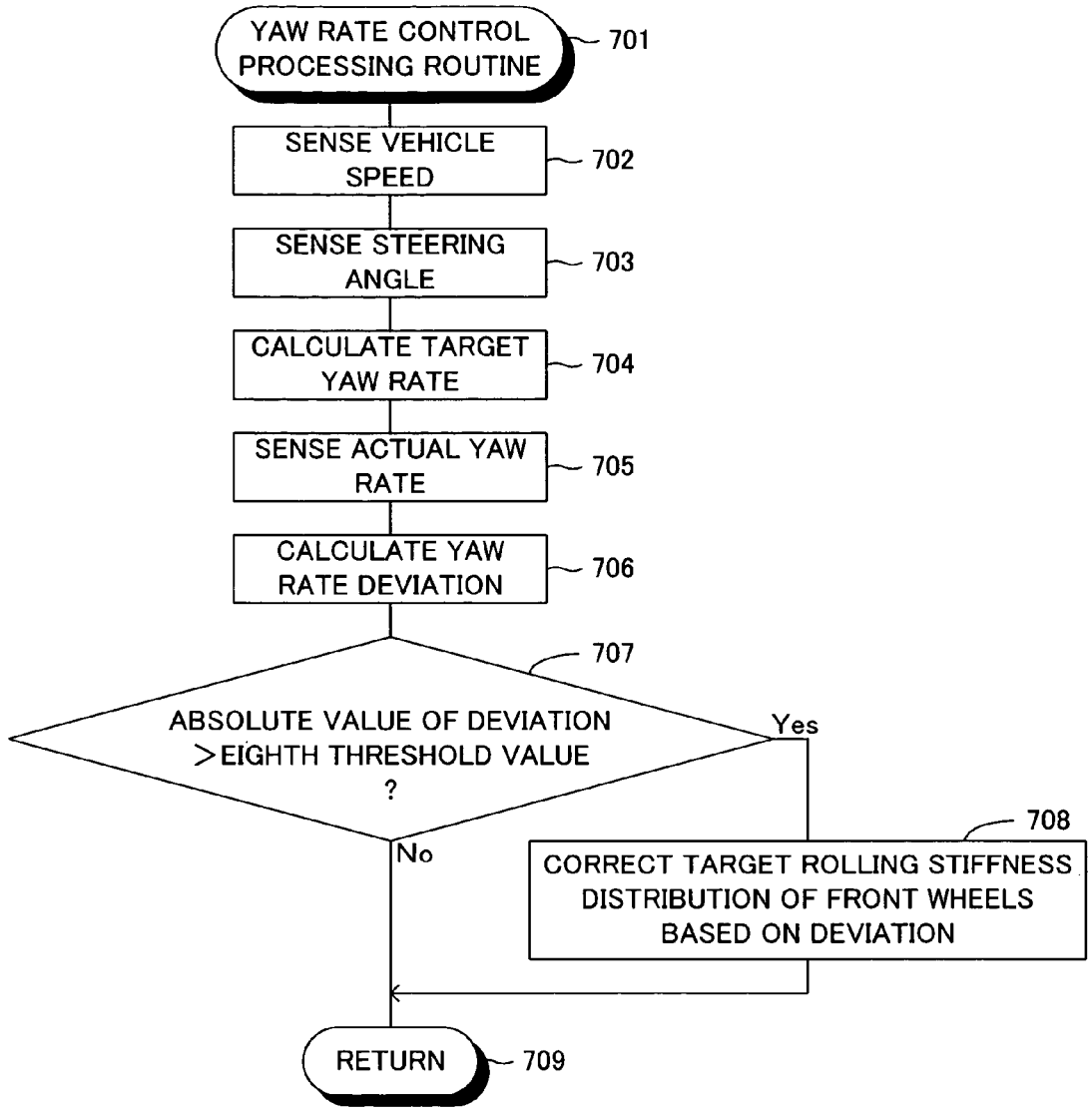
FIG. 11 is a flow chart showing a subroutine executed in Step 700 of FIG. 3.
Figure 12:
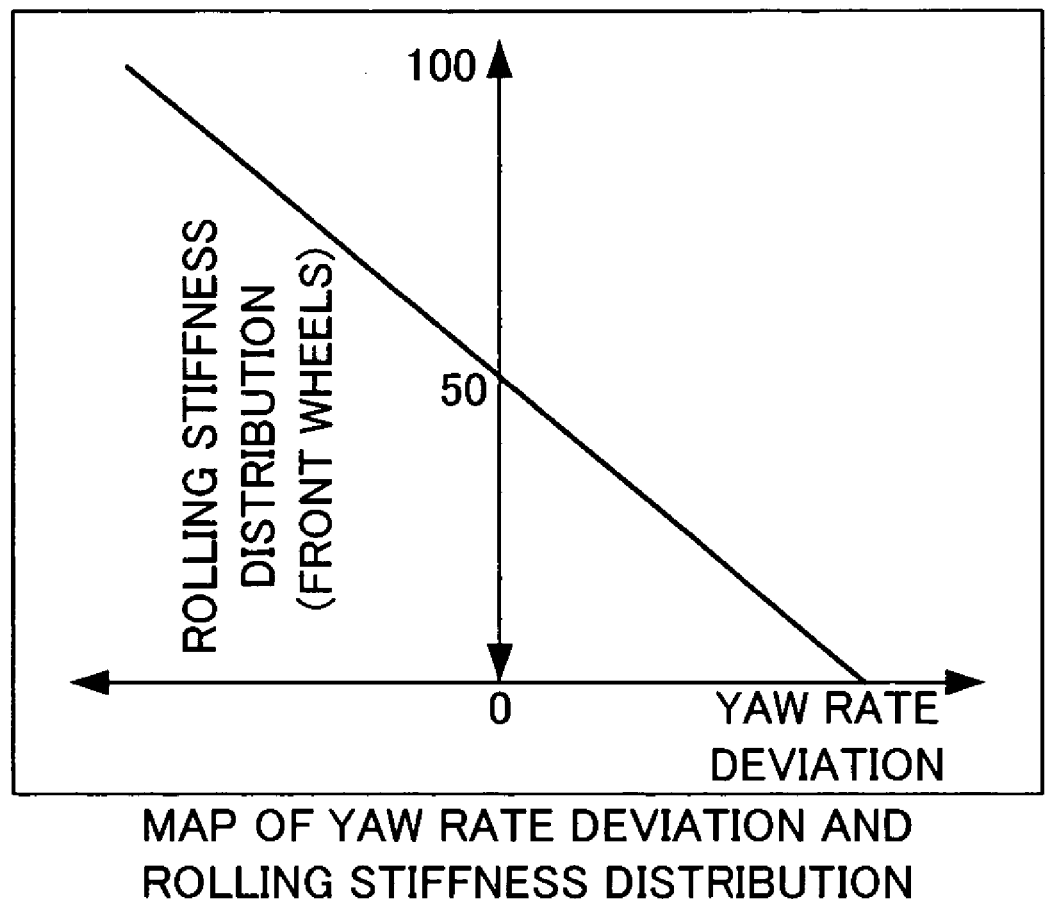
FIG. 12 is a map showing the relationship between the yaw rate deviation and the rolling stiffness distribution (front wheels).

When the CPU of the electric control unit ECU performs yaw rate control processing in Step 700 of FIG. 3, it executes the subroutine shown in FIG. 11. Specifically, the CPU of the electric control unit ECU begins processing in Step 701. In Step 702, it senses and stores the vehicle speed from the signal from the vehicle speed sensor S3 (see FIG. 1). In Step 703, it senses and stores the steering angle from the signal from the steering angle sensor S2 (see FIG. 1). In Step 704, it calculates the target yaw rate. The target yaw rate is calculated from the vehicle speed and the steering angle by the relational equation "target yaw rate=vehicle speed×steering angle×a constant".

In Step 705, the CPU of the electric control unit ECU senses and stores the actual yaw rate (actual yaw rate) from the signal from the yaw rate sensor S7 (see FIG. 1). In Step 706, it calculates and stores the deviation of the yaw rate, i.e., the difference between the target yaw rate and the actual yaw rate. At this time, if the absolute value of the deviation is greater than an eighth threshold value (such as about 0.1 degrees per second), the CPU of the electric control unit ECU makes a determination of Yes in Step 707. In Step 708, it corrects the target rolling stiffness distribution of the front wheels in accordance with the deviation of the yaw rate while referring to the map of FIG. 12, and then it performs Step 709 and returns to the main routine of FIG. 3. At this time, if the absolute value of the deviation is less than or equal to the eighth threshold value, the CPU of the electric control unit ECU makes a determination of No in Step 707, and then it performs Step 709 and returns to the main routine of FIG. 3.

Figure 13:
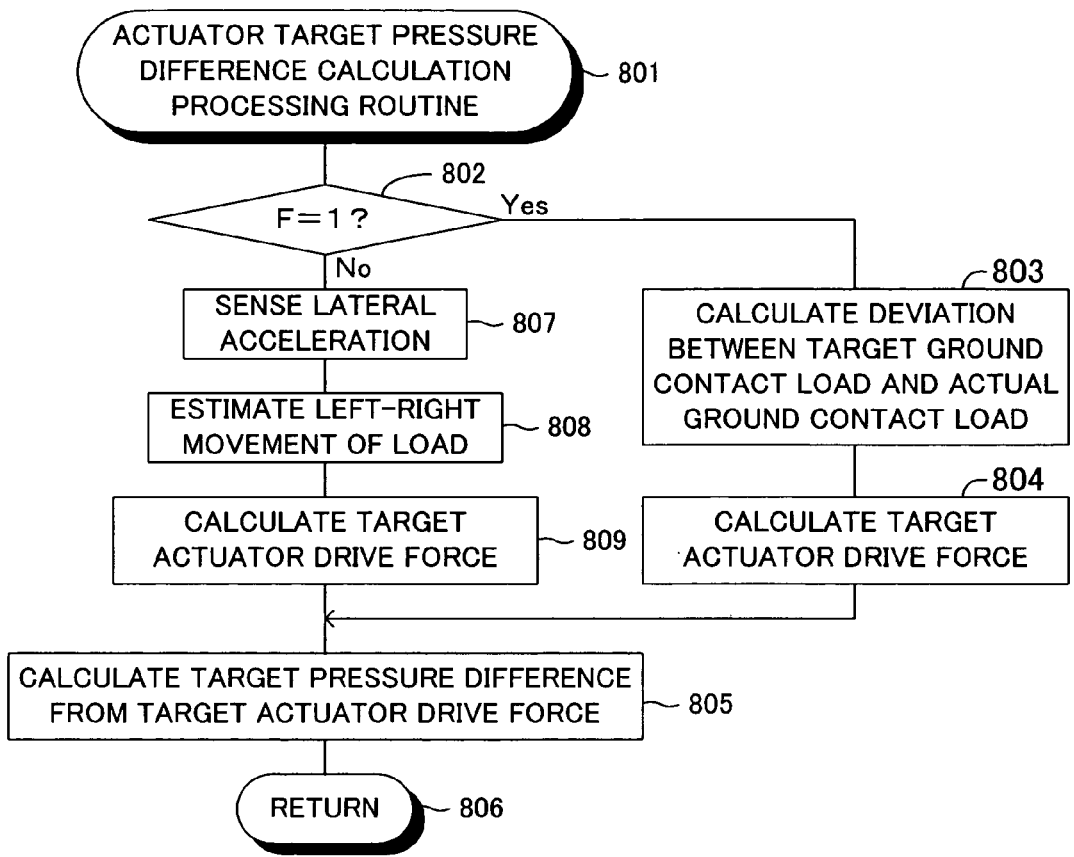
FIG. 13 is a flow chart showing a subroutine executed in Step 800 of FIG. 3.

When the CPU of the electric control unit ECU performs the actuator target pressure difference calculation processing in Step 800 of FIG. 3, it executes the subroutine of FIG. 13. Specifically, the CPU of the electric control unit ECU begins processing from Step 801. In Step 802, it determines whether flag F is 1. At this time, if flag F is 1, the CPU of the electric control unit ECU makes a determination of Yes in Step 802, then after performing Steps 803, 804, and 805, it performs Step 806 and returns to the main routine of FIG. 3.

In above-mentioned Step 803, the CPU of the electric control unit ECU calculates and stores the deviation between the target ground contact load of the left rear wheel obtained by executing the subroutines shown in FIGS. 5-7 and the actual ground contact load of the left rear wheel at this time (the actual ground contact load being calculated by multiplying the pressure obtained from the signal from the hydraulic pressure sensor PS3 (see FIG. 1) provided on the suspension hydraulic cylinder 13 for the left rear wheel by the pressure receiving area of the suspension hydraulic cylinder 13).

In above-mentioned Step 804, the CPU of the electric control unit ECU calculates and stores the target actuator drive force (the axial force applied to the rod 58c of the actuator 58) necessary to eliminate the deviation calculated in Step 803 using the relational equation "target actuator drive force=deviation×a constant", and in Step 805, it calculates and stores the target actuator pressure difference (the pressure difference between oil chambers R1 and R2 in the actuator 58) based on the target actuator drive force.

If flag F is 0 at the time of performing Step 802, the CPU of the electric control unit ECU makes a determination of No in Step 802, and after performing Steps 807, 808, and 809, it performs above-described Steps 805 and 806 and returns to the main routine of FIG. 3.

In above-mentioned Step 807, the CPU of the electric control unit ECU calculates and stores the actual lateral acceleration from the signal from the lateral acceleration sensor S8 (see FIG. 1), and in Step 808, it estimates the left-right load movement amount based on the actual lateral acceleration and specifications of the vehicle (the sprung masses of the vehicle, the height of the center of gravity, the tread) using the relational equation "amount of load movement=mass on springs of vehicle×lateral acceleration×height of center of gravity/tread". In above-mentioned Step 809, the CPU of the electric control unit ECU calculates and stores the target actuator drive force based on the target rolling stiffness distribution of the front wheels obtained by the execution of the subroutine in FIG. 9 or FIG. 11, the left-right load movement amount obtained in Step 808, the pressure receiving area of the piston rods of the suspension hydraulic cylinders 11-14, and the pressure receiving area of the pistons 51a-54a of the ground contact load changing apparatus 50 using the relational equation "target actuator drive force=(target rolling stiffness distribution of the front wheels×2−1)×(left-right load movement amount)×(piston area of ground contact load changing apparatus 50)/(pressure receiving area of the piston rods of the suspension hydraulic cylinders)".

When the CPU of the electric control unit ECU performs the motor control processing of Step 900 of FIG. 3, it executes the subroutine shown in FIG. 14. Specifically, the CPU of the electric control unit ECU begins processing in Step 901. After it performs Steps 902-906, it performs Step 907 and returns to the main routine of FIG. 3.

In above-mentioned Step 902, the CPU of the electric control unit ECU senses and stores the actual hydraulic pressure in the oil chambers R1 and R2 of the actuator 58 from the signals from hydraulic pressure sensors PS5 and PS6 (see FIG. 1). In above-mentioned Step 903, it calculates and stores the difference between the actual hydraulic pressures (actual pressure difference) in the oil chambers R1 and R2. In above-mentioned Step 904, the CPU of the electric control unit ECU calculates and stores the deviation between the target pressure difference obtained in Step 805 of FIG. 12 and the actual pressure difference obtained in above-described Step 903. In above-mentioned Step 905, it calculates and stores the motor current (the drive direction and the drive force) of the electric motor 62 based on the deviation between the target pressure difference and the actual pressure difference from the relational equation "motor current=deviation×a constant". In above-mentioned Step 906, the CPU of the electric control unit ECU outputs a drive signal indicating the motor current obtained in above-described Step 905 to the drive circuit 70 for the electric motor 62.

As is clear from the above explanation, in this first embodiment of a vehicle suspension apparatus, when a change occurs from a state in which the tire pressure of all the wheels is a normal value (at least the third threshold value) to a state in which the tire pressure of the left rear wheel RL is smaller than the third threshold value, Steps 302, 303, 304, 305, 306, 308, and 309 of the subroutine of FIG. 5 are performed, Steps 802, 803, 804, and 805 of the subroutine in FIG. 13 are performed, all of the steps of the subroutine of FIG. 14 are performed, and the electric motor 62 is driven with the motor current (drive direction and drive force) obtained in Step 905 of FIG. 14.

Figure 15A:
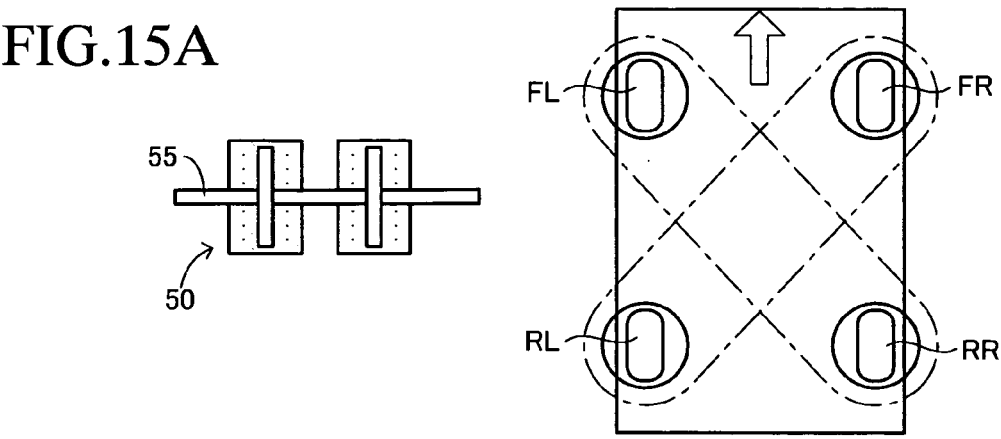
FIGS. 15A, 15B, and 15C are explanatory views showing operation when control of the ground contact load is performed in the first embodiment when the vehicle is travelling straight ahead.
Figure 15B:
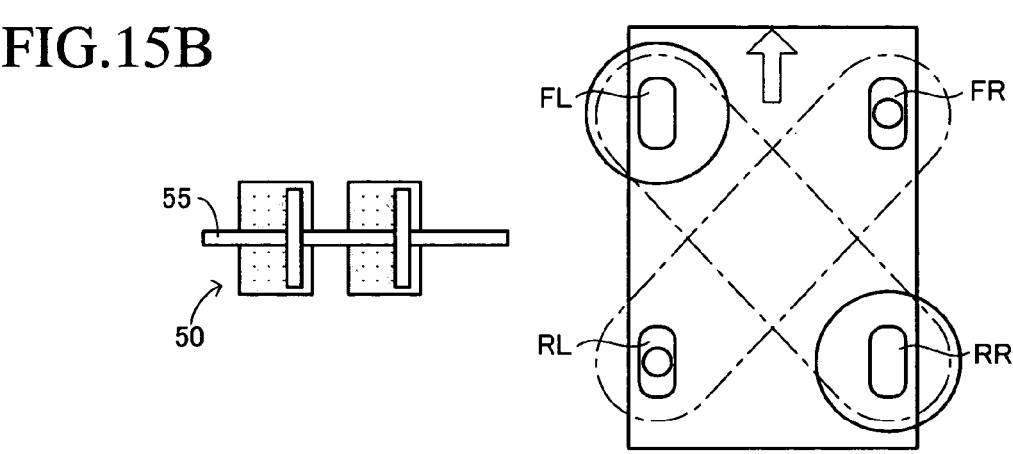
Figure 15C:
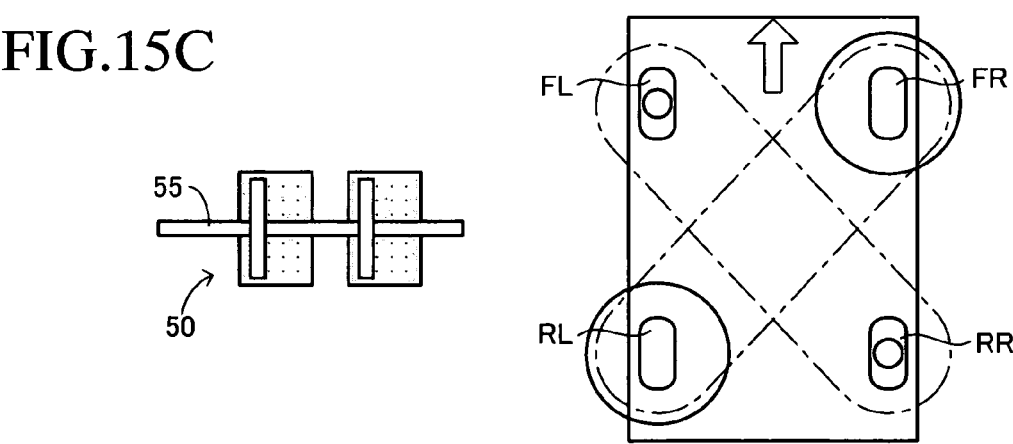

Therefore, as shown in FIG. 15A and FIG. 15B, the connecting rod 55 of the ground contact load changing apparatus 50 is pressed by the actuator 58 from the state shown in FIG. 15A towards the state shown in FIG. 15B, and in the left and right front wheels, the ground contact load can be moved from the right front wheel FR to the left front wheel FL, while in the left and right rear wheels, the ground contact load can be moved from the left rear wheel RL to the right rear wheel RR. Accordingly, the ground contact load of the left rear wheel RL for which the tire pressure has become smaller than the third threshold value is decreased, and damage to the tire mounted on the left rear wheel RL can be decreased. In FIGS. 15A, 15B, and 15C, the size of the ground contact load on each of wheels FL, FR, RL, and RR is indicated by the size of the circles.

When the tire pressure of the right front wheel FR has become smaller than the third threshold value, Steps 302, 303, 314, 315, 316, and 317 of the subroutine of FIG. 5 are performed, Steps 802, 803, 804, and 805 of the subroutine of FIG. 13 are performed, all of the steps of the subroutine of FIG. 14 are performed, and it is possible to obtain operation like the above-described operation. The ground contact load of the right front wheel FR of which the tire pressure has become less than the third threshold value is decreased, and damage to the tire mounted on the right front wheel FR can be reduced.

When the tire pressure of the right rear wheel RR has become less than the third threshold value, Steps 302, 303, 304, 305, 310, 311, and 312 of the subroutine of FIG. 5 are performed, Steps 802, 803, 804, and 805 of the subroutine of FIG. 13 are performed, all of the steps of the subroutine of FIG. 14 are performed, and the electric motor 62 is driven with the motor current (drive direction and drive force) obtained in Step 905 of FIG. 14.

As a result, as shown in FIGS. 15A and 15C, the connecting rod 55 of the ground contact load changing apparatus 50 is pushed by the actuator 58 from the state shown in FIG. 15A towards the state shown in FIG. 15C, and in the left and right front wheels, the ground contact load is moved from the left front wheel FL to the right front wheel FR. In addition, in the left and right rear wheels, the ground contact load is moved from the right rear wheel RR to the left rear wheel RL. Accordingly, the ground contact load of the right rear wheel RR of which the tire pressure has become smaller than the third threshold value is reduced, and damage to the tire mounted on the right rear wheel RR can be reduced.

When the tire pressure of the left front wheel FL has become less than the third threshold value, Steps 302, 303, 304, 313, 311, and 312 of the subroutine of FIG. 5 are performed, Steps 802, 803, 804, and 805 of the subroutine of FIG. 13 are performed, all of the steps of the subroutine of FIG. 14 are performed, and it becomes possible to obtain operation like the above-described operation. The ground contact load of the left front wheel FL of which the tire pressure has become less than the third threshold value is decreased, and damage to the tire mounted on the left front wheel FL can be reduced.

In this first embodiment of a vehicle suspension apparatus, when, for example, side slip of the rear wheels during VSC control is occurring during a right turn and the brake fluid pressure of the right front wheel FR has become less than or equal to the fourth threshold value and the brake fluid pressure of the left front wheel FL has become greater than the fourth threshold value, Steps 402, 403, 405, 406, 407, 408, and 409 of the subroutine of FIG. 6 are performed, Steps 802, 803, 804, and 805 of the subroutine of FIG. 13 are performed, all of the steps of the subroutine of FIG. 14 are performed, and the drive motor 62 is driven by the motor current (drive direction and drive force) obtained in Step 905 of FIG. 14.

Therefore, at this time, the connecting rod 55 of the ground contact load changing apparatus 50 is pressed by the actuator 58 towards the state shown in FIG. 16B, and the ground contact load can be moved to the left front wheel FL and the right rear wheel RR. Accordingly, the braking force of the left front wheel FL is increased, and the amount of side slip of the rear wheels can be reduced. In FIGS. 16A, 16B, and 16C, the size of the ground contact load on each of wheels FL, FR, RL, and RR is shown by the size of the circles.

When side slip of the front wheels during VSC control is occurring during a left turn and the brake fluid pressure of the right front wheel FR has become greater than the fourth threshold value and the brake fluid pressure of the left rear wheel RL has become greater than the fifth threshold value and the brake fluid pressure of the right rear wheel RR has become less than or equal to the fifth threshold value, Steps 402, 403, 405, 406, 410, 411, 408, and 409 of the subroutine of FIG. 6 are performed, Steps 802, 803, 804, and 805 of the subroutine of FIG. 13 are performed, all of the steps of the subroutine of FIG. 14 are performed, and the electric motor 62 is driven by the motor current (drive direction and drive force) obtained in Step 905 of FIG. 14.

Therefore, at this time, the connecting rod 55 of the ground contact load changing apparatus 50 is pressed by the actuator 58 towards the state shown in FIG. 17B, and the ground contact load can be moved to the left front wheel FL and the right rear wheel RR. Accordingly, the rolling stiffness distribution becomes more towards the rear, and an oversteering tendency is produced, so the amount of side slip of the front wheels can be reduced. In FIGS. 17A, 17B, and 17C, the size of the ground contact load of each of the wheels FL, FR, RL, and RR is shown by the size of the circles.

When side slip of the rear wheels during VSC control is occurring during a left turn and the brake fluid pressure of the right front wheel FR has become greater than the fourth threshold value and the brake fluid pressure of the left rear wheel RL has become less than or equal to the fifth threshold value, Steps 402, 403, 405, 406, 410, 412, and 413 of the subroutine of FIG. 6 are performed, Steps 802, 803, 804, and 805 of the subroutine of FIG. 13 are performed, all of the steps of the subroutine of FIG. 14 are performed, and the electric motor 62 is driven by the motor current (drive direction and drive force) obtained in Step 905 of FIG. 14.

Therefore, at this time, the connecting rod 55 of the ground contact load changing apparatus 50 is pressed by the actuator 58 towards the state shown in FIG. 17C, and the ground contact load can be moved to the right front wheel FR and the left rear wheel RL. Accordingly, the braking force of the right front wheel FR is increased, and the amount of side slip of the rear wheels can be decreased.

When side slip of the front wheels during VSC control is occurring during a right turn and the brake fluid pressure of the right front wheel FR has become greater than the fourth threshold value and the brake fluid pressure of the left rear wheel RL has become less than or equal to the fifth threshold value, Steps 402, 403, 405, 406, 410, 412, and 413 of the subroutine of FIG. 6 are performed, Steps 802, 803, 804, and 805 of the subroutine of FIG. 13 are performed, all the steps of the subroutine of FIG. 14 are performed, and the electric motor 62 is driven by the motor current (drive direction and drive force) obtained in Step 905 of FIG. 14.

Therefore, at this time, the connecting rod 55 of the ground contact load changing apparatus 50 is moved by the actuator 58 towards the state shown in FIG. 16C, and the ground contact load can be moved to the right front wheel FR and the left rear wheel RR. Accordingly, the rolling stiffness distribution becomes more towards the rear and an oversteering tendency is produced, so the amount of side slip of the front wheels can be reduced.

In this first embodiment of a vehicle suspension apparatus, if, for example, during braking control for a transversely uneven road, only the left front wheel FL is on a road surface having a high μ, Steps 502, 503, 505, 506, 507, 508, 509, 510, 511, and 512 of the subroutine of FIG. 7 are performed, Steps 802, 803, 804, and 805 of the subroutine of FIG. 13 are performed, all of the steps of the subroutine in FIG. 14 are performed, and the electric motor 62 is driven by the motor current (drive direction and drive force) obtained in Step 905 of FIG. 14.

Therefore, at this time, the connecting rod 55 of the ground contact load changing apparatus 50 is pushed by the actuator 58 from the state shown in FIG. 15A towards the state shown in FIG. 15C, the ground contact load can be moved to the right front wheel FR and the left rear wheel RL, and the ground contact load on the left front wheel FL can be decreased. Accordingly, the braking force of the left front wheel FL is decreased, and a spin due to an unbalanced yawing moment can be avoided.

During braking control on a transversely uneven road, if the front and rear left wheels are on a road surface having a high μ and the front and rear right wheels are on a road surface having a low μ, Steps 502, 503, 505, 506, 507, 508, 509, 510, 513, and 512 of the subroutine of FIG. 7 are performed, Steps 802, 803, 804, and 805 of the subroutine of FIG. 13 are performed, all of the steps of the subroutine of FIG. 14 are performed, and the electric motor 62 is driven by the motor current (drive direction and drive force) obtained in Step 905 of FIG. 14.

As a result, at this time, the connecting rod 55 of the ground contact load changing apparatus 50 is pushed by the actuator 58 towards the state shown in FIG. 15B, the ground contact load is moved to the left front wheel FL and the right rear wheel RR, and the ground contact load on the right rear wheel RR can be increased. Accordingly, the product of the road surface t and the ground contact load for the rear wheels can be made equal on the left and right sides, and the braking force of the rear wheels can be maximized.

During braking control for a transversely uneven road, when the front and rear right wheels are on a road surface having a high μ and the front and rear left wheels are on a road surface having a low μ, Steps 502, 503, 505, 506, 507, 508, 514, 513, and 512 of the subroutine of FIG. 7 are performed, Steps 802, 803, 804, and 805 of the subroutine of FIG. 13 are performed, all of the steps of the subroutine of FIG. 14 are performed, and the electric motor 62 is driven with the motor current (drive direction and drive force) obtained in Step 905 of FIG. 14.

As a result, at this time, the connecting rod 55 of the ground contact load changing apparatus 50 is moved by the actuator 58 towards the state shown in FIG. 15C, the ground contact load can be moved to the right front wheel FR and the left front wheel RL, and the ground contact load on the left rear wheel RL can be increased. Accordingly, the product of the road surface μ and the ground contact load for the rear wheels can be made equal on the left and right sides, and the braking force of the rear wheels can be maximized.

During braking control for a transversely uneven road, when only the right front wheel FR is on a road surface having a high μ, Steps 502, 503, 505, 506, 507, 508, 514, 515, and 512 of the subroutine of FIG. 7 are performed, Steps 802, 803, 804, and 805 of the subroutine of FIG. 13 are performed, all of the steps of the subroutine of FIG. 14 are performed, and the electric motor 62 is driven by the motor current (drive direction and drive force) obtained in Step 905 of FIG. 14.

As a result, at this time, the connecting rod 55 of the ground contact load changing apparatus 50 is pushed by the actuator 58 towards the state shown in FIG. 15B, and the ground contact load can be moved to the left front wheel FL and the right rear wheel RR, while the ground contact load on the right front wheel FR can be decreased. Accordingly, the braking force of the right front wheel FR is decreased, and a spin due to an unbalanced yawing moment can be avoided.

In this first embodiment of a vehicle suspension apparatus, when, for example, the vehicle speed during a right turn becomes greater than the ninth threshold value, Steps 602, 603, 604, 605, and 606 of the subroutine in FIG. 9 are performed, Steps 802, 807, 808, 809, and 805 of the subroutine of FIG. 13 are performed, all the steps of the subroutine of FIG. 14 are performed, and the electric motor 62 is driven by the motor current (drive direction and drive force) obtained in Step 905 of FIG. 14.

As a result, at this time, the connecting rod 55 of the ground contact load changing apparatus 50 is pressed by the actuator 58 towards the state shown in FIG. 16B, and the ground contact load can be moved to the left front wheel FL (the front wheel on the outside of the turn) and the right rear wheel RR (the rear wheel on the inside of the turn). Accordingly, at this time, the rolling stiffness distribution is made more towards the front and an understeering tendency is produced, so the stability of the vehicle can be increased. In addition, at this time, by performing Step 606, the control speed is decreased and the change in behavior can be made small.

During a right turn at a vehicle speed of less than or equal to the ninth threshold value, if the gear ratio of the VGRS mechanism becomes small or the vehicle speed decreases, Steps 602, 603, 604, 605, 608, and 606 of the subroutine of FIG. 9 are performed, Steps 802, 807, 808, 809, and 805 of the subroutine of FIG. 13 are performed, all of the steps of the subroutine of FIG. 14 are performed, and the electric motor 62 is driven by the motor current (drive direction and drive force) obtained in Step 905 of FIG. 14.

As a result, at this time, the connecting rod 55 of the ground contact load changing apparatus 50 is pressed by the actuator 58 towards the state shown in FIG. 16C, and the ground contact load can be moved to the right front wheel FR (the front wheel on the inside of the turn) and the left rear wheel RL (the rear wheel on the outside of the turn). Accordingly, at this time, the rolling stiffness distribution is moved more towards the rear and an oversteering tendency is produced, so maneuverability can be increased. In addition, at this time, by performing Step 606, the control speed is reduced and changes in behavior can be made small.

When the vehicle speed is less than or equal to the ninth threshold value during a right turn, if the gear ratio of the VGRS becomes large or the vehicle speed increases, Steps 602, 603, 604, 605, and 608 of the subroutine of FIG. 9 are performed, Steps 802, 807, 808, 809, and 805 of the subroutine of FIG. 13 are performed, all the steps of the subroutine of FIG. 14 are performed, and the electric motor 62 is driven by the motor current (drive direction and drive force) obtained in Step 905 of FIG. 14.

As a result, at this time, the connecting rod 55 of the ground contact load changing apparatus 50 is pressed by the actuator 58 towards the state shown in FIG. 16B, and the ground contact load can be moved to the left front wheel FL (the front wheel on the outside of the turn) and the right rear wheel RR (the rear wheel on the inside of the turn). Accordingly, at this time, the rolling stiffness distribution is moved more towards the front, and an understeering tendency is produced, so the stability of the vehicle can be increased. In addition, at this time, Step 606 is not performed, so the control speed is increased and the effectiveness of control can be increased.

In this first embodiment of a vehicle suspension apparatus, when, for example, during a right turn, the absolute value of the deviation between the target yaw rate and the actual yaw rate has become greater than the eighth threshold value, all of the steps of the subroutine in FIG. 11 are performed, Steps 802, 807, 808, 809, and 805 of the subroutine of FIG. 13 are performed, all of the steps of the subroutine of FIG. 14 are performed, and the electric motor 62 is driven by the motor current (drive direction and drive force) obtained in Step 905 of FIG. 14.

As a result, when the actual yaw rate at that time is greater than the target yaw rate; the connecting rod 55 of the ground contact load changing apparatus 50 is pushed by the actuator 58 towards the state shown in FIG. 16B, and the ground contact load can be moved to the left front wheel FL (the front wheel on the outside of the turn) and the right rear wheel RR (the rear wheel on the inside of the turn). Accordingly, at this time, the rolling stiffness distribution of the front wheels is increased and an understeering tendency is produced, so the actual yaw rate can be made to approach the target yaw rate.

When the actual yaw rate at this time is smaller than the target yaw rate, the connecting rod 55 of the ground contact load changing apparatus 50 is pushed by the actuator 58 towards the state shown in FIG. 16C, and the ground contact load can be moved to the right front wheel FR (the front wheel on the inside of the turn) and the left rear wheel RL (the rear wheel on the outside of the turn). Accordingly, at this time, the rolling stiffness distribution of the rear wheels is increased, and an oversteering tendency is produced, so the actual yaw rate can be made to approach the target yaw rate.

In this first embodiment, a damping means in the form of shock absorber 57 and an elastic means in the form of coil spring 56 are disposed between the ground contact load changing apparatus 50 and the actuator 58. As a result, control can be performed such that the operation of the ground contact load control cylinders 51-54 is always allowed by coil spring 56 and shock absorber 57, the input of vibrations from the road surface can be absorbed by coil spring 56 and shock absorber 57, and the ride comfort can be increased. It is also possible to carry out the invention without disposing a damping means in the form of shock absorber 57 and an elastic means in the form of coil spring 56 between the ground contact load changing apparatus 50 and the actuator 58.

In this vehicle suspension apparatus of the first embodiment, at the time of bouncing of the vehicle body, the bouncing suppressor 20 operates, and bouncing of the vehicle body is controlled. At this time, each of the suspension hydraulic cylinders 11, 12, 13, and 14 performs approximately the same operation (compression), so approximately the same hydraulic pressure (high hydraulic pressure) is supplied to the control cylinders 21-24, 31-34, and 41-44 from each of ports 11a, 12a, 13a, and 14a through pipes P1, P2, P3, and P4.

At this time, the hydraulic pressure is balanced in each of the control cylinders 31, 34, 32, 33 and 41, 44, 42, 43 of the rolling suppressor 30 and the pitching suppressor 40, and pistons 31a, 34a, 32a, 33a, and 41a, 44a, 42a, 43a do not operate. On the other hand, in the bouncing suppressor 20, pistons 21a, 22a, 23a, and 24a operate under the influence of the accumulator 25 and the variable aperture 26, and the operation of the suspension hydraulic cylinders 11, 12, 13, and 14, i.e., bouncing of the vehicle body is suppressed and shocks from the road surface are cushioned.

In this vehicle suspension apparatus of the first embodiment, at the time of rolling of the vehicle body, the rolling suppressor 30 operates, and rolling of the vehicle body is controlled. At this time (for example, at the time of a left turn of the vehicle), both suspension hydraulic cylinders 12 and 14 on the right side perform approximately the same operation (compression), and both of the suspension hydraulic cylinders 11 and 13 on the left side perform approximately the same operation (elongation), so approximately the same hydraulic pressure (high hydraulic pressure) is supplied from the ports 12a and 14a of both suspension hydraulic cylinders 12 and 14 on the right side to the control cylinders 22, 24, 32, 34 and 42, 44 through pipes P2 and P4, and approximately the same hydraulic pressure (low hydraulic pressure) is supplied from control cylinders 21, 23, 31, 33 and 41, 43 to the ports 11a and 13a of both suspension hydraulic cylinders 11 and 13 on the left side through pipes P1 and P3.

At this time, the hydraulic pressure is balanced in the control cylinders 21, 24, 22, 23, and 41, 44, 42, 43 of the bouncing suppressor 20 and the pitching suppressor 40, and pistons 21a, 24a, 22a, 23a, and 41a, 44a, 42a, 43a do not operate. On the other hand, in the rolling suppressor 30, the pistons 31a, 34a and 32a, 33a which are connected by connecting rod 35 operate under the influence of coil spring 36 and shock absorber 37, and the operation of the suspension hydraulic cylinders 11, 12, 13, and 14, i.e., rolling of the vehicle body is suppressed.

In this vehicle suspension apparatus of the first embodiment, at the time of pitching of the vehicle body, the pitching suppressor 40 operates, and pitching of the vehicle body is controlled. At this time (for example, when the vehicle is diving), both of the suspension hydraulic cylinders 11 and 12 on the front side perform approximately the same operation (compression), and both of the suspension hydraulic cylinders 13 and 14 on the rear side perform approximately the same operation (elongation), so approximately the same hydraulic pressure (high hydraulic pressure) is supplied from ports 11a and 12a of both suspension hydraulic cylinders 11 and 12 on the front side to control cylinders 21, 22, 31, 32, and 41, 42 through pipes P1 and P2, and approximately the same hydraulic pressure (low hydraulic pressure) is supplied from control cylinders 23, 24, 33, 34 and 43, 44 to the ports 13a and 14a of both suspension hydraulic cylinders 13 and 14 on the rear side through pipes P3 and P4.

At this time, the hydraulic pressure in the control cylinders 21, 24, 22, 23 and 31, 34, 32, 33 of the bouncing suppressor 20 and the rolling suppressor 30 are balanced, and pistons 21a, 24a, 22a, 23a, and 31a, 34a, 32a, 33a do not operate. On the other hand, in the pitching suppressor 40, pistons 41a, 44a, and 42a, 43a which are connected by the connecting rod 45 operate under the influence of coil spring 46 and shock absorber 47, and operation of the suspension hydraulic cylinders 11, 12, 13, and 14, i.e., pitching of the vehicle body is suppressed.

In this vehicle suspension apparatus of the first embodiment, when twisting is imparted to the vehicle on an irregular surface, the right front and left rear suspension hydraulic cylinders 12 and 13 perform approximately the same operation (compression), and the left front and right rear suspension hydraulic cylinders 11 and 14 perform approximately the same operation (elongation), so approximately the same hydraulic pressure (the same intermediate hydraulic pressure as shown in FIG. 1) is supplied from the ports 12a and 13a of both suspension hydraulic cylinders 12 and 13 through pipes P2 and P3 to control cylinders 22, 23, 32, 33, and 42, 43, and approximately the same hydraulic pressure (intermediate hydraulic pressure) is supplied from control cylinders 21, 24, 31, 34 and 41, 44 to the ports 11a and 14a of suspension hydraulic cylinders 11 and 14 through pipes P1 and P4.

In this state, the hydraulic pressures of the control cylinders 31, 34, 32, 33 and 41, 44, 42, 43 of the rolling suppressor 30 and the pitching suppressor 40 are balanced, and pistons 31a, 34a, 32a, 33a and 41a, 44a, 42a, 43a do not operate. On the other hand, in the bouncing suppressor 20, working fluid is supplied to control cylinders 22 and 23, working fluid is discharged from control cylinders 21 and 24, and pistons 21a, 24a, and 22a, 23a operate in the same direction, but the amounts of operation are approximately the same, so the bouncing suppressor 20 essentially does not function (it does not restrain the operation of the suspension hydraulic cylinders 11, 12, 13, and 14).

As is clear from the above explanation, in this vehicle suspension apparatus of the first embodiment, the structure is such that the operation of each suspension hydraulic cylinder 11, 12, 13, and 14 is independently restrained by the bouncing suppressor 20 comprising the accumulator 25 (a spring element) and the variable aperture 26 (a damping element), the rolling suppressor 30 comprising coil spring 36 (a spring element) and shock absorber 37 (a damping element), and the pitching suppressor 40 comprising coil spring 46 (a spring element) and shock absorber 47 (a damping element), and properties of the spring elements and damping elements which specify the suppressing functions of the suppressors 20, 30, and 40 can be individually set. Accordingly, each type of behavior of the vehicle body (bouncing, rolling and pitching) can be individually set for suitable properties, and each type of behavior can be optimally restrained.

In this vehicle suspension apparatus of the first embodiment, a hydraulic circuit can be formed by connecting the single ports 11a-14a of the suspension hydraulic cylinders 11-14 mounted on the corresponding front and rear, left and right wheels by pipes P1-P4, and a hydraulic circuit can be simply and inexpensively constituted. In addition, the behavior of the vehicle body in the heave direction (bouncing) can be effectively suppressed, and when a twisting force acts on the vehicle body through the front and rear, left and right wheels on an irregular road surface or the like, a pair of diagonally opposed hydraulic control cylinders 20A and 20B can freely operate in phase with each other without operating the accumulator 25 of the bouncing suppressor 20, a decrease in the ground contact load of each wheel can be suppressed, and a reduction in the drive force can be suppressed. Accordingly, the attitude of the vehicle body and the drive force of each wheel can both be maintained without making the hydraulic circuit in the suspension apparatus complicated.

In this vehicle suspension apparatus of the first embodiment, the pistons 21a, 24a, and 22a, 23a of the control hydraulic cylinders 21, 24, and 22, 23 which constitute the diagonally opposed hydraulic control cylinders 20A, 20B in the bouncing suppressor 20 are connected with each other, so the diagonally opposed hydraulic control cylinders 20A and 20B can be compactly constituted.

In this vehicle suspension apparatus of the first embodiment, the connecting means 20C which connects the diagonally opposed hydraulic control cylinders 20A and 20B in the bouncing suppressor 20 comprises the accumulator 25 and the variable aperture 26, and they form a liquid-tight connecting structure using working fluid as a medium, so by employing a structure (not shown) in which the working fluid of oil chamber 27 (or the oil chamber 25a of the accumulator 25) which communicates with the accumulator 25 through the variable aperture 26 is discharged and input in accordance with the vehicle load, for example, the vehicle height can be adjusted while maintaining the attitude of the vehicle body.

In this vehicle suspension apparatus of the first embodiment, the rolling suppressor 30 and the pitching suppressor 40 are provided in addition to the bouncing suppressor 20, so the behavior of the vehicle body in the heave direction (bouncing) can be effectively restrained, and the behavior of the vehicle body in the rolling direction (rolling) and the behavior in the pitching direction (pitching) can also be effectively restrained.

In this vehicle suspension apparatus of the first embodiment, by providing an actuator which can control the increase or decrease in the hydraulic pressure in the hydraulic pressure chamber 25 of the bouncing suppressor 20, or by providing an actuator (shown by virtual lines in FIG. 2) which can control an increase or decrease of the spring force of coil spring 36 in the rolling suppressor 30, or by providing an actuator (shown by virtual lines in FIG. 2) which can control an increase or decrease of the spring force of coil spring 46 in the pitching suppressor 40, the attitude of the vehicle body can be actively controlled.

Figure 18:
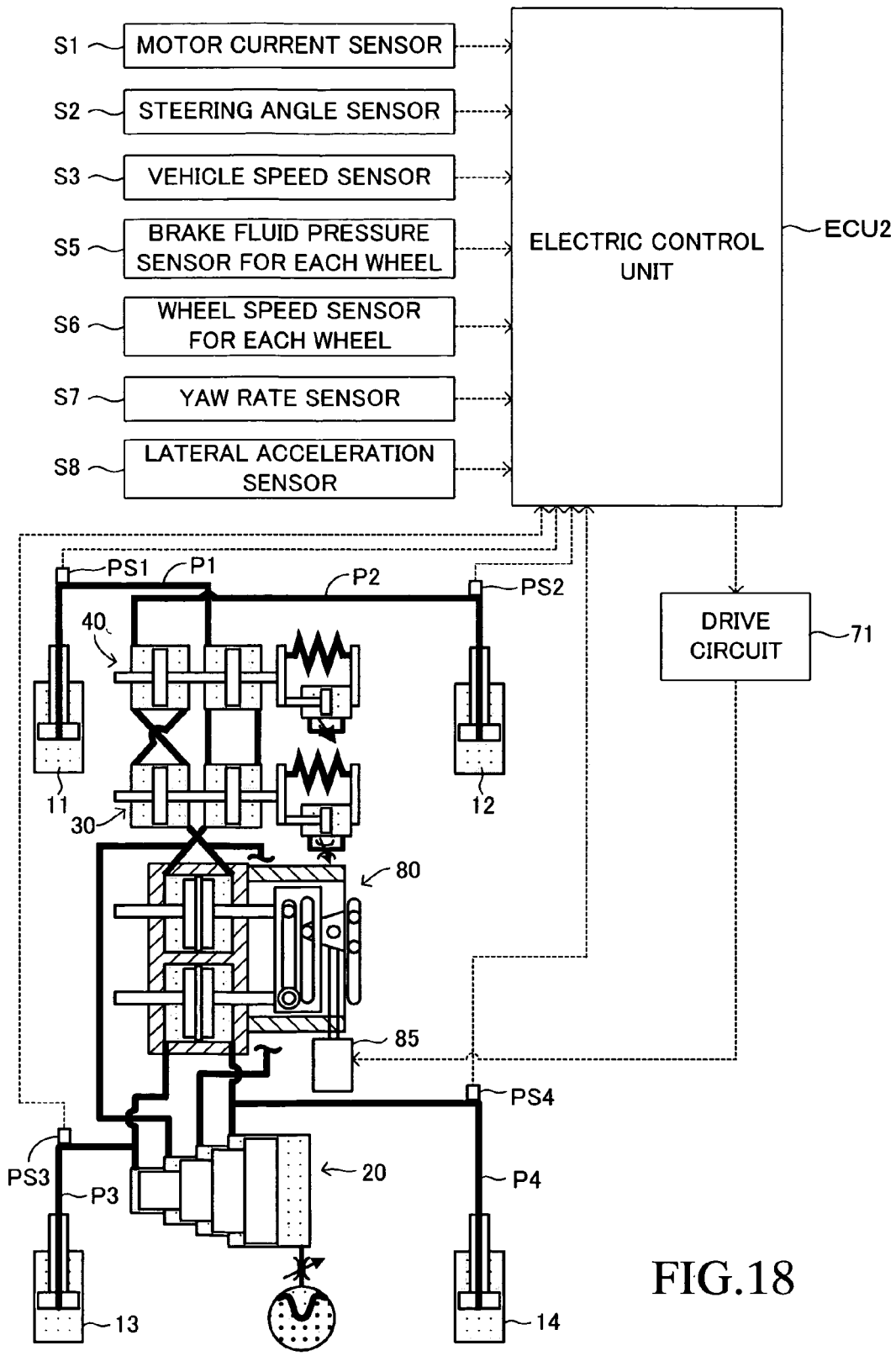
FIG. 18 is a view schematically showing the structure of a second embodiment of a vehicle suspension apparatus including a vehicle ground contact load control apparatus according to the present invention.
Figure 19:
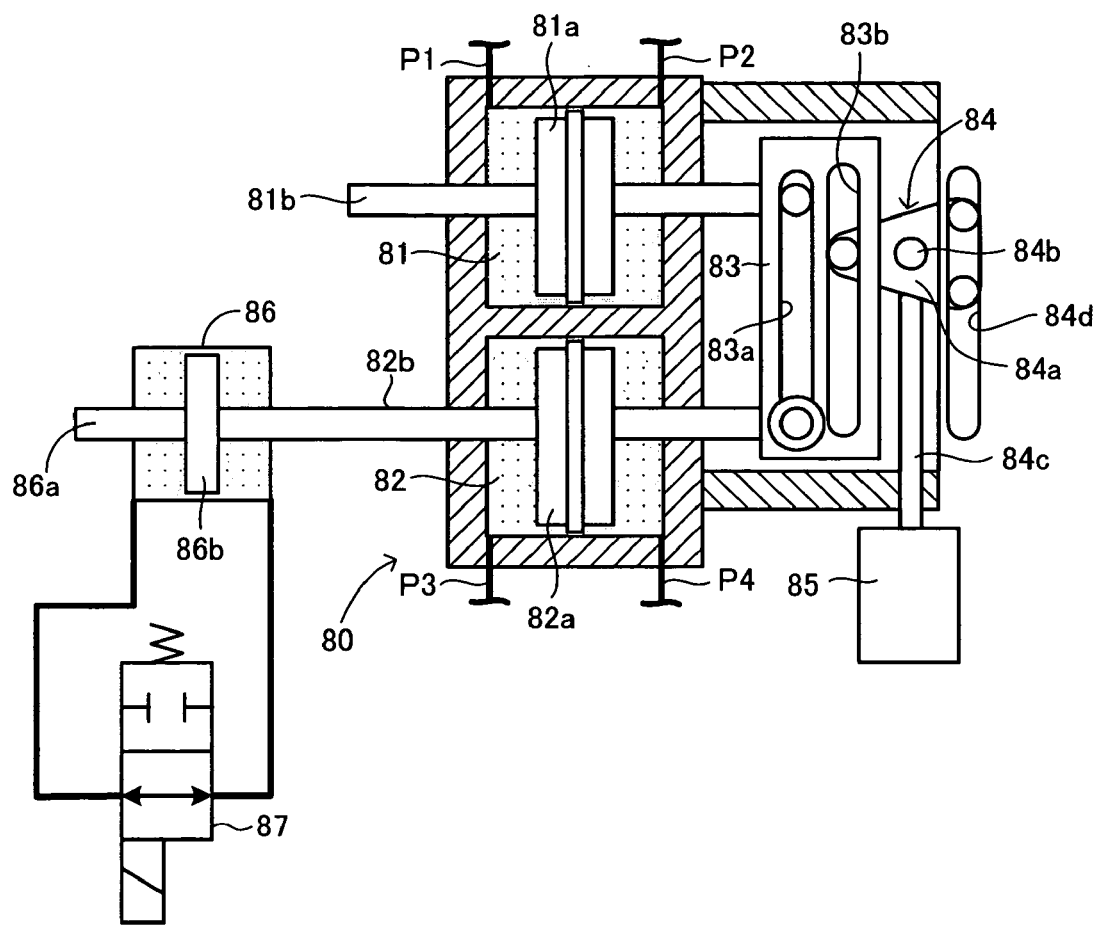
FIG. 19 is an enlarged view of the mechanical system shown in FIG. 18.

In the above-described first embodiment, as shown in FIGS. 1 and 2, a vehicle ground contact load control apparatus according to the present invention is constituted so as to have a ground contact load changing apparatus 50 and a hydraulic pressure control apparatus 60 which controls the operation of the actuator 58 in the ground contact load changing apparatus 50 under the control of an electric control unit ECU. However, as in the case of the second embodiment shown in FIGS. 18 and 19, a vehicle ground contact load control apparatus according to the present invention may be embodied by a structure having a ground contact load changing apparatus 80 comprising a ground contact load control hydraulic cylinder 81 which receives the hydraulic pressures from the suspension hydraulic cylinders 11 and 12 for the left and right front wheels and is operated by the pressure difference, another ground contact load control hydraulic cylinder 82 which receives the hydraulic pressures from the suspension hydraulic cylinders 13 and 14 for the left and right rear wheels and is operated by the pressure difference, an axial force ratio varying mechanism 84 which can vary the ratio of the axial force acting on the piston rods 81b and 82b of the ground contact load control hydraulic cylinders 81 and 82 by changing the support point of an arm 83 connecting the piston rods 81b and 82b, and an actuator 85 which can change the position of the support point of the arm 83 under the control of the electric control unit ECU.

The first ground contact load control hydraulic cylinder 81 has its interior partitioned into two oil chambers by a piston 81a which can slide in the axial direction. These oil chambers are connected with the ports 11a and 12a of suspension hydraulic cylinders 11 and 12 by pipes P1 and P2, respectively. A piston rod 81b which is integral with the piston 81a extends to the outside of the cylinder. It is connected to one end of the arm 83 so as to be able to slide along a first elongated hole 83a.

The other ground contact load control hydraulic cylinder 82 has its interior partitioned into two oil chambers by a piston 82a which can slide in the axial direction. These oil chambers are connected to the ports 13a and 14a of suspension hydraulic cylinders 13 and 14 by pipes P3 and P4, respectively. A piston rod 82b which is integral with the piston 82a extends to the outside of the cylinder. One of its ends is rotatably connected to the other end of the arm 83. The other end of piston rod 82b is connected to the rod 86a of a lock cylinder 86.

The axial force ratio varying mechanism 84 comprises a movable base 84a which can move in the lengthwise direction of the arm 83, a connecting shaft 84b which is installed at an intermediate position of the movable base 84a, and a threaded shaft 84c which is threadingly connected to a nut portion (not shown) provided on the connecting shaft 84b. The movable base 84a is installed so as to be able to move in a guide hole 84d provided in a stationary portion, and it is connected so as to be able to slide along another elongated hole 83b in the arm 83.

The actuator 85 is an electric motor which can change the support point position of the arm 83 by rotatably driving the threaded shaft 84c of the axial force ratio varying mechanism 84 to thereby move the movable base 84a along guide hole 84d. Its operation (rotational direction and number of revolutions) are controlled by the electric control unit ECU2 shown in FIG. 18. Drive signals from the electric control unit ECU2 are applied thereto through a drive circuit 71.

The lock cylinder 86 is for the purpose of restricting or allowing movement of piston rod 82b in the axial direction. Oil chambers which are separated by its piston 86b are made to communicate with or are cut off from each other through a two-port two-position on-off valve 87. The two-port two-position on-off valve 87 is controlled by the electric control unit ECU2 through the drive circuit 71 to perform open and closing operation. In its open state, it allows piston rod 82b to move in the axial direction, and in its closed state, it restricts movement of piston rod 82b in the axial direction.

The electric control unit ECU2 is electrically connected to hydraulic pressure sensors PS1-PS4 and the drive circuit 71, and it is also electrically connected to a motor current sensor S1, a steering angle sensor S2, a vehicle speed sensor S3, a brake fluid pressure sensor S5 for each wheel, a wheel speed sensor S6 for each wheel, a yaw rate sensor S7, a lateral acceleration sensor S8, and the like.

The electric control unit ECU2 comprises a microcomputer having a CPU, a ROM, a RAM, an interface, and the like. When an ignition switch (not shown) is in an ON state, the CPU of the electric control unit ECU2 repeatedly performs a control program corresponding to the flow chart of FIG. 20 at prescribed intervals (such as every 8 msec), and it controls the operation of the actuator 85 and the two-port two-position on-off valve 87.

The electric control unit ECU2 outputs a VSC control signal during VSC control to a known VSC apparatus (vehicle stability control apparatus) which suppresses understeering and oversteering when the vehicle is turning. The electric control unit ECU2 is also constituted so as to be able to control the operation of a known variable gear ratio steering (VGRS) mechanism which varies the steering gear ratio in accordance with the vehicle speed.

In this vehicle suspension apparatus of the second embodiment having the above-described structure, in a state in which the ignition switch is turned ON, the CPU of the electric control unit ECU2 controls the operation of the actuator 85 based on signals from the various sensors, and it controls the ground contact load of the front and rear, left and right wheels FL, FR, RL, and RR.

Figure 20:
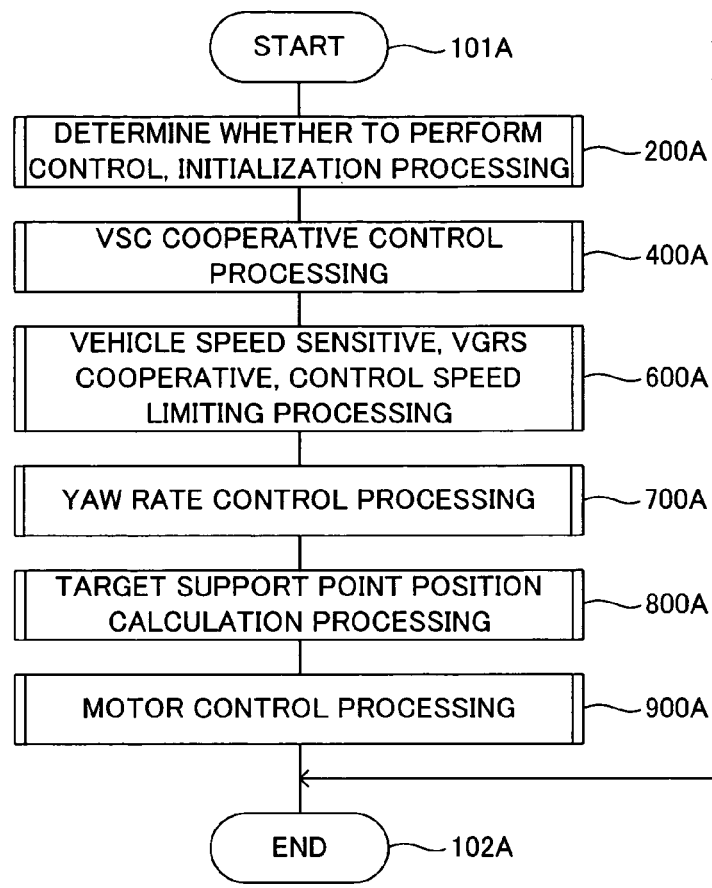
FIG. 20 is a flow chart showing a main routine executed by the CPU of the electric control unit shown in FIG. 18.

Control of the ground contact load is carried out by the CPU of the electric control unit ECU2 repeatedly performing the main routine shown in FIG. 20 at prescribed operating intervals (such as every 8 msec). The CPU of the electric control unit ECU2 begins processing in Step 101A of FIG. 20. In Step 200A, it determines whether to perform control and performs initialization processing. In Step 400A, it performs VSC cooperative control processing. In Step 600A, it performs vehicle speed sensitive—VGRS cooperative—control speed limiting processing. In Step 700A, it performs yaw rate control processing. In Step 800A, it performs target support point position calculation processing. In Step 900A, it performs motor control processing. In Step 102A, processing temporarily ends.

Figure 21:
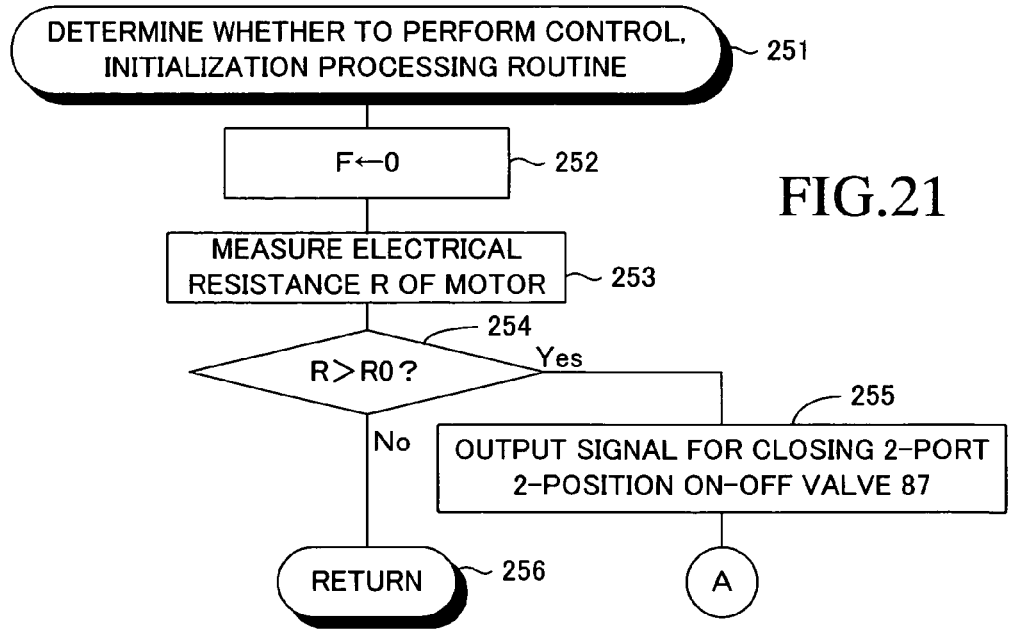
FIG. 21 is a flow chart showing a subroutine executed in Step 200A of FIG. 20.

When the CPU of the electric control unit ECU2 performs a determination of whether to carry out control and initialization processing in Step 200A of FIG. 20, it executes the subroutine shown in FIG. 21. Specifically, the CPU of the electric control unit ECU2 begins processing in Step 251. In Step 252, it sets flag F to 0. In Step 253, it measures and stores the electrical resistance R of the actuator (electric motor) 85. This electrical resistance R is measured based on the signal from the motor current sensor S1 when a minute current is passed through the actuator 85. When the actuator 85 has a wire breakage and is not conducting, the electrical resistance is greater than a set value Ro.

Therefore, when the actuator 85 has a wire breakage (at the time of a failure), the CPU of the electric control unit ECU2 makes a determination of Yes in Step 254. In Step 255, it outputs to the drive circuit 71a close signal which puts the two-port two-position on-off valve 87 in a closed state, and then it returns to Step 102A of FIG. 20, and in Step 102A, processing temporarily ends. Accordingly, when the actuator 85 has a wire breakage and the operation of the actuator 85 cannot be controlled, the lock cylinder 86 is hydraulically locked by the two-port two-position on-off valve 87, and the operation of the ground contact load changing apparatus 80 is disabled. On the other hand, when the actuator 85 does not have a wire breakage, the CPU of the electric control unit ECU2 makes a determination of No in Step 254, and then it performs Step 256 and returns to the main routine of FIG. 20.

Figure 22:
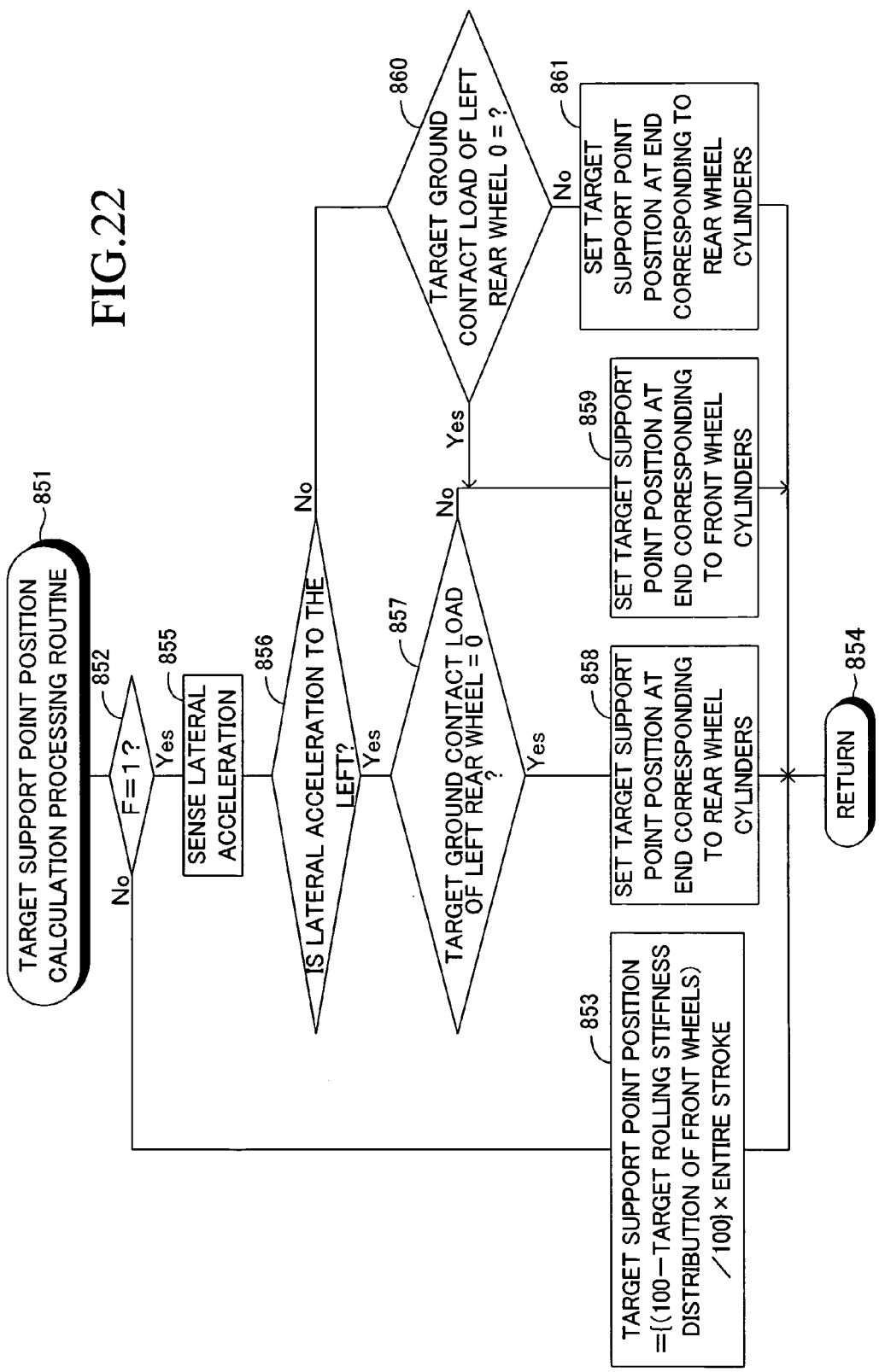
FIG. 22 is a flow chart showing a subroutine executed in Step 800A of FIG. 20.

When the CPU of the electric control unit ECU2 performs the target support point calculation processing in Step 800A of FIG. 20, it executes the subroutine shown in FIG. 22. Specifically, the CPU of the electric control unit ECU2 begins processing in Step 851. In Step 852, it checks flag F. If flag F is 0, it performs Step 853, and then it performs Step 854 and returns to the main routine of FIG. 20. In Step 853, taking the position of the movable base 84a at the end adjoining the cylinder for the rear wheels (the position shown in FIG. 24B) as 0 and taking the position at the end adjoining the cylinder for the front wheels (the position shown in FIG. 24C) as 100, the target support point position is calculated and set based on an equation using the length between the positions (the entire stroke) and the target rolling stiffness distribution of the front wheels.

If flag F is 1 and the lateral acceleration is towards the left and the target ground contact load of the left rear wheel is 0, Steps 855, 856, 857, and 858 are performed, and then Step 854 is performed and the main routine of FIG. 20 is returned to. If flag F is 1 and the lateral acceleration is towards the left and the target ground contact load of the left rear wheel is not 0, Steps 855, 856, 857, and 859 are performed, and then Step 854 is performed and the main routine of FIG. 20 is returned to.

When flag F is 1 and the lateral acceleration is towards the right and the target ground contact load of the left rear wheel is 0, Steps 855, 856, 860, and 859 are performed, and then Step 854 is performed and the main routine of FIG. 20 is returned to. When flag F is 1 and the lateral acceleration is towards the right and the target ground contact load of the left rear wheel is not 0, Steps 855, 856, 860, and 861 are performed, and then Step 854 is performed and the main routine of FIG. 20 is returned to.

Figure 23:
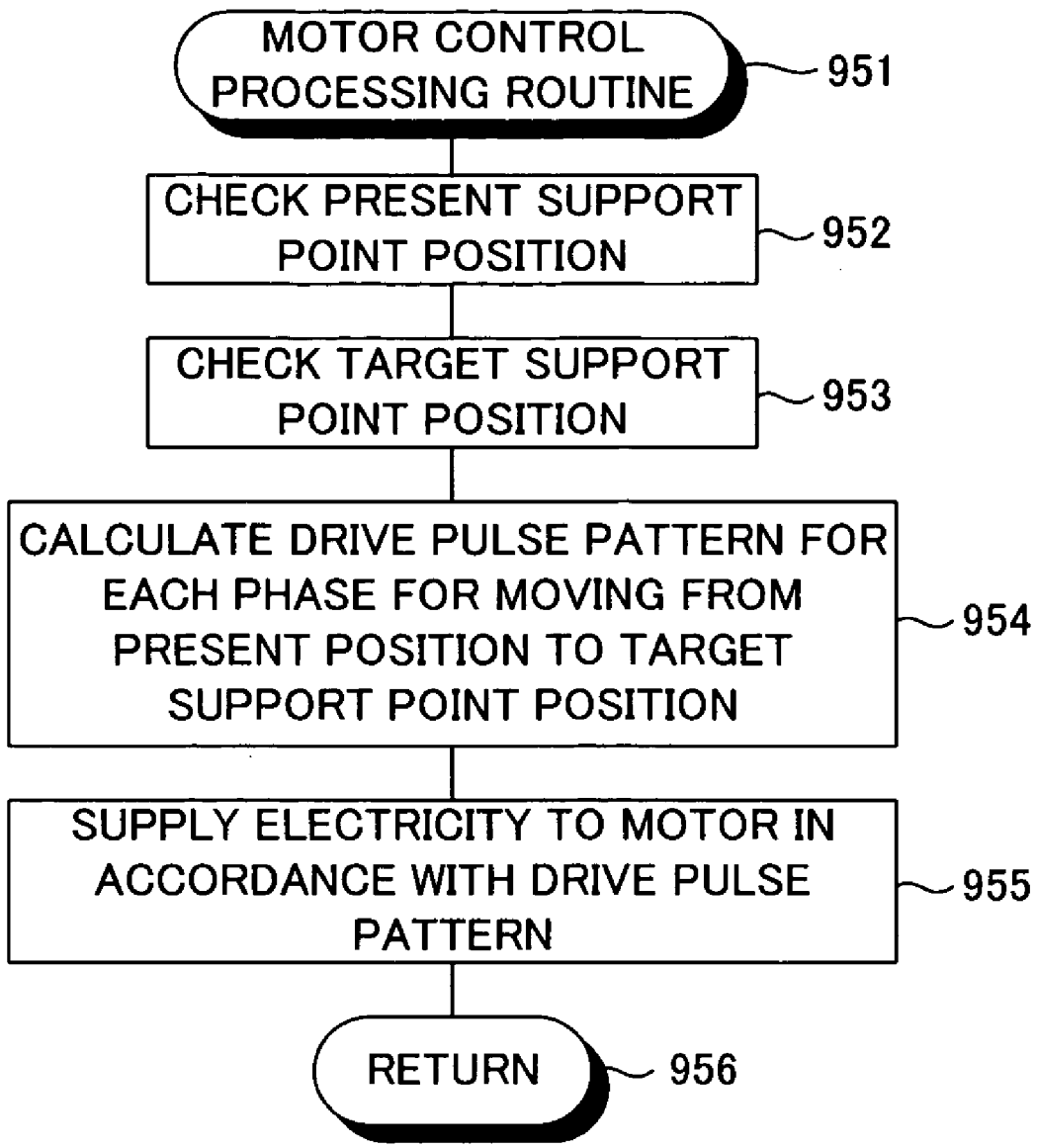
FIG. 23 is a flow chart showing a subroutine executed in Step 900A of FIG. 20.

When the CPU of the electric control unit ECU2 performs the motor control processing of Step 900A of FIG. 20, it performs the subroutine shown in FIG. 23. Specifically, the CPU of the electric control unit ECU2 begins processing in Step 951. After it performs Steps 952, 953, 954, and 955, it performs Step 956 and returns to the main routine of FIG. 20.

When the CPU of the electric control unit ECU2 performs VSC cooperative control processing in Step 400A of FIG. 20, it performs substantially the same subroutine as the subroutine shown in FIG. 6 of the above-described first embodiment. When the CPU of the electric control unit ECU2 performs the processing of Step 600A of FIG. 20, it performs substantially the same subroutine as the subroutine shown in FIG. 9 of the above-described first embodiment. When the CPU of the electric control unit ECU2 performs the yaw rate control processing of Step 700A of FIG. 20, it performs substantially the same subroutine as the subroutine shown in FIG. 11 of the above-described first embodiment. Therefore, an explanation of the subroutines performed in Steps 400A, 600A, and 700A of FIG. 20 will be omitted.

As is clear from the above explanation, in this vehicle suspension apparatus of the second embodiment, when, for example, side slip of the front wheels is occurring during VSC control during a left turn, the brake fluid pressure of the right front wheel FR has become greater than the fourth threshold value, the brake fluid pressure of the left rear wheel RL has become greater than the fifth threshold value, and the brake fluid pressure of the right rear wheel RR has become less than or equal to the fifth threshold value, in a subroutine like the subroutine of FIG. 6, steps like each of Steps 402, 403, 405, 406, 410, 411, 408, and 409 of FIG. 6 are performed, Steps 852, 855, 856, 857, and 858 of the subroutine of FIG. 22 are performed, all of the steps of the subroutine of FIG. 23 are performed, and the actuator (electric motor) 85 is made to conduct and is driven with the drive pulse pattern obtained by the calculation in Step 954.

Figure 24A:
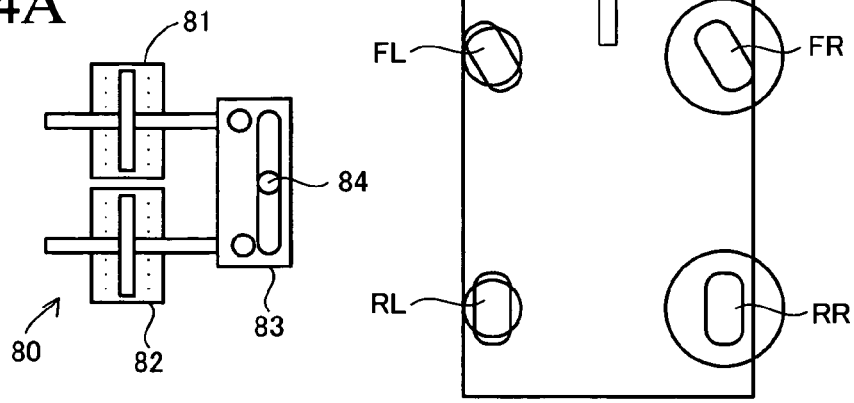
FIGS. 24A, 24B, and 24C are explanatory views showing the operation when control of the ground contact load is carried out in the second embodiment when the vehicle is turning to the left.
Figure 24B:
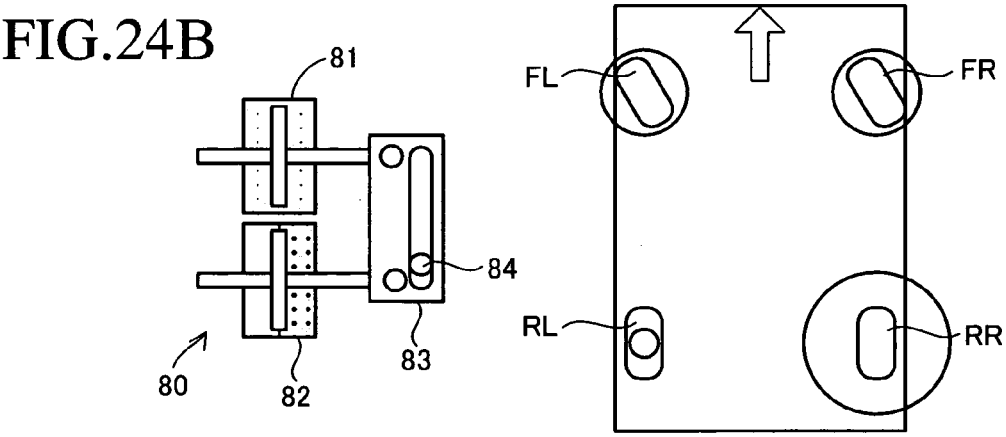
Figure 24C:
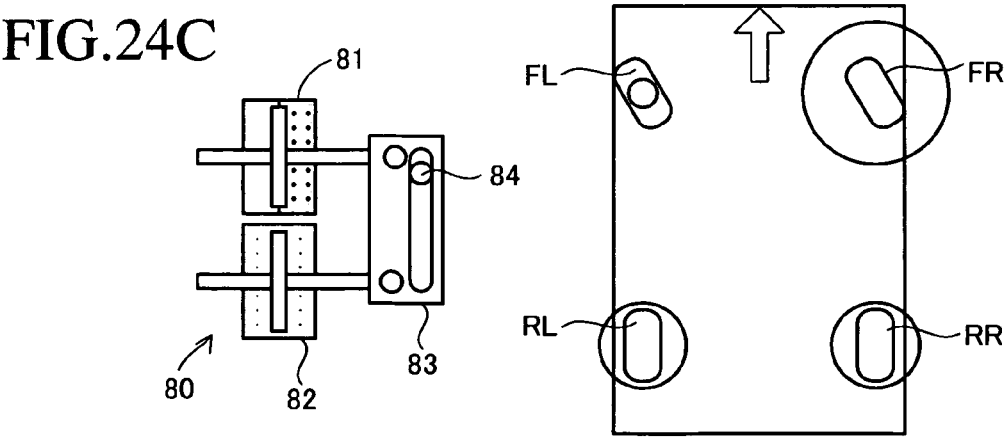

As a result, at this time, the movable base 84a of the ground contact load changing apparatus 80 is pressed by the actuator 85 towards the state shown in FIG. 24B, and the ground contact load can be moved to the left front wheel FL and the right rear wheel RR. Accordingly, the rolling stiffness distribution is moved towards the rear and an oversteering tendency is produced, so side slip of the front wheels can be reduced. In FIGS. 24A, 24B, and 24C, the size of the ground contact load on each of the wheels FL, FR, RL, and RR is indicated by the size of the circles.

During VSC control in a left turn, when side slip of the rear wheels is occurring, the brake fluid pressure of the right front wheel FR is greater than the fourth threshold value, and the brake fluid pressure of the left rear wheel RL is less than or equal to the fifth threshold value, in a subroutine like the subroutine of FIG. 6, Steps 402, 403, 405, 406, 410, 412, and 413 of FIG. 6 are performed, Steps 852, 855, 856, 857, and 859 of the subroutine of FIG. 22 are performed, all of the steps of the subroutine of FIG. 23 are performed, and the actuator (electric motor) 85 is made to conduct and driven by a drive pulse pattern obtained by the calculation in Step 954.

As a result, at this time, the movable base 84a of the ground contact load changing apparatus 80 is pressed by the actuator 85 towards the state shown in FIG. 24C, and the ground contact load can be moved to the right front wheel FR and the left rear wheel RL. Accordingly, the braking force of the right front wheel FR can be increased, and side slip of the rear wheels can be decreased.

It is believed that other specific operations and effects which are obtained by this second embodiment can be easily understood from the description of the specific operation and effects of the above-described first embodiment and of the specific operation and effects of the above-described second embodiment, so an explanation thereof will be omitted.

Figure 25:
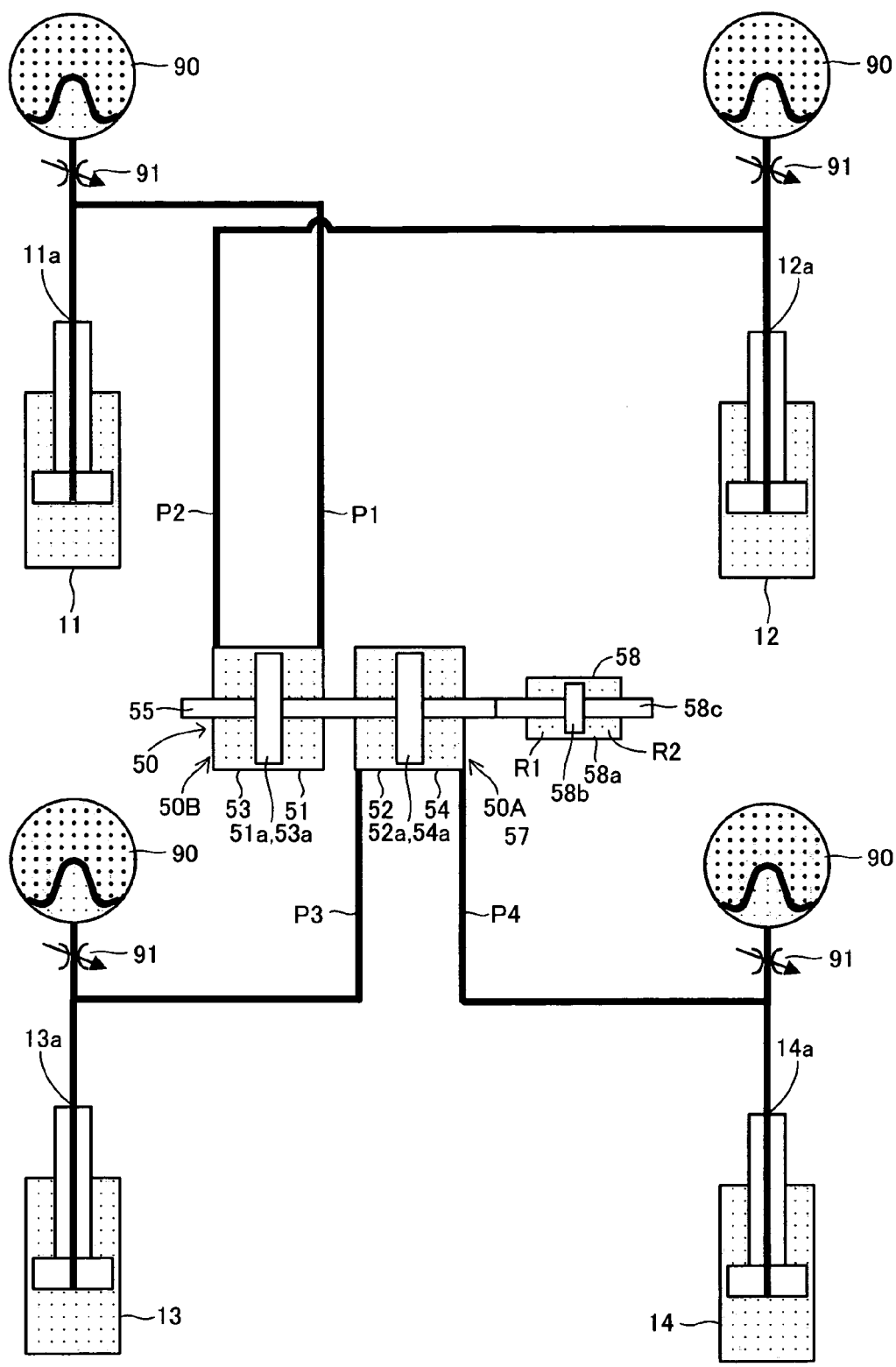
FIG. 25 is a view schematically showing the structure of a modified embodiment of a mechanical system in a vehicle ground contact load control apparatus according to the present invention.

In each of the above-described embodiments, the present invention was embodied by a structure including a bouncing suppressor 20, a rolling suppressor 30, and a pitching suppressor 40. However, as shown in FIG. 25, it is possible to carry out the invention by a structure not having a bouncing suppressor 20, a rolling suppressor 30, or a pitching suppressor 40 and by providing an accumulator 90 and a damping valve 91 for each of the suspension hydraulic cylinders 11, 12, 13, and 14.

In each of the above-described embodiments, the present invention was carried out by embodiments in which the entire ground contact load of the front and rear, left and right wheels FL, FR, RL, and RR was supported by the suspension hydraulic cylinders 11, 12, 13, and 14, but it is also possible to carry out the invention by an embodiment in which an auxiliary spring is provided parallel to each of the suspension hydraulic cylinders 11, 12, 13, and 14, and the ground contact load of each of the front and rear, left and right wheels FL, FR, RL, and RR is supported by the suspension hydraulic cylinders 11, 12, 13, and 14 and the auxiliary springs (an embodiment in which each of the auxiliary springs supports a portion of the ground contact load of each of the wheels FL, FR, RL, and RR).

When carrying out the present invention, if a control program is set so as to disable the operation of the ground contact load control hydraulic cylinders when the input of vibrations from the road surface is too great, the output required of the actuators can be decreased, and the size of the actuators and the energy consumption of the actuators can be decreased.

In the above explanation, various embodiments of the present invention were explained. However, it should be understood that various modifications of the present invention can be carried out without departing from the spirit and scope thereof.

The invention claimed is:

1. A ground contact load control apparatus for a vehicle comprising:
   front and rear, left and right load bearing means for supporting the ground contact load of front and rear, left and right wheels, respectively;
   a load changing means which operates to change the load supported by each of the load bearing means;
   a vehicle state sensing means which senses the state of the vehicle; and
   a control means which controls the operation of the load changing means in accordance with a signal from the vehicle state sensing means, wherein the load changing means increases or decreases the ground contact load of any pair of diagonally opposed wheels and the ground contact load of the other pair of diagonally opposed wheels in opposite directions from each other and increases or decreases the ground contact load of diagonally opposed wheels in the same direction as the load changing means, wherein
   the front and rear, left and right load bearing means which support the ground contact loads of the front and rear, left and right wheels comprise front and rear, left and right suspension hydraulic cylinders each having a port and mounted on a corresponding one of the front and rear, left and right wheels, and the load changing means which operates to change the ground contact load which is supported by each of the suspension hydraulic cylinders comprises ground contact load control hydraulic cylinders which receive the hydraulic pressure from each of the suspension hydraulic cylinders and operate based on the pressure difference, an actuator which imparts an operating force to the ground contact load control hydraulic cylinders, and damping means and elastic means provided between the ground contact load control hydraulic cylinders and the actuator.

2. A ground contact load control apparatus for a vehicle as set forth in claim 1, further comprising a pitching control hydraulic cylinder which controls pitching of the vehicle body, a rolling control hydraulic cylinder which controls rolling of the vehicle body, and a heave control hydraulic cylinder which controls bouncing of the vehicle body, provided in a hydraulic circuit including each of the suspension hydraulic cylinders and the ground contact load control hydraulic cylinders.

3. A ground contact load control apparatus for a vehicle as set forth in claim 1, further comprising an accumulator and a damping valve provided for each suspension hydraulic cylinder.

4. A ground contact load control apparatus for a vehicle as set forth in claim 1, further comprising a releasing means which permits the ground contact load control hydraulic cylinders to freely move.

5. A ground contact load control apparatus for a vehicle as set forth in claim 1, further comprising a securing means which disables the operation of the ground contact load control hydraulic cylinders.

6. A ground contact load control apparatus for a vehicle as set forth in claim 1, wherein the vehicle state sensing means comprises a tire pressure sensing means which senses the tire pressure of each of the front and rear, left and right wheels.

7. A ground contact load control apparatus for a vehicle as set forth in claim 1, wherein the control means comprises an operating amount determining means which determines the operating amount of the load changing means in accordance with a signal from the vehicle state sensing means.

8. A ground contact load control apparatus for a vehicle as set forth in claim 1, wherein the control means comprises an operating speed determining means which determines the operating speed of the load changing means based on a signal from the vehicle state sensing means.

9. A ground contact load control apparatus for a vehicle as set forth in claim 8, wherein the vehicle state sensing means comprises a vehicle speed sensing means which senses the vehicle speed, and the operating speed determined by the operating speed determining means decreases as the vehicle speed sensed by the vehicle speed sensing means increases.

10. A ground contact load control apparatus for a vehicle as set forth in claim 8, wherein the vehicle state sensing means comprises a gear ratio obtaining means which obtains the gear ratio of a variable gear ratio steering mechanism, and the operating speed determined by the operating speed determining means decreases as the gear ratio obtained by the gear ratio obtaining means increases.

11. A ground contact load control apparatus for a vehicle as set forth in claim 1, wherein the control means comprises an allowing means which allows operating control by the load changing means when the vehicle speed is higher than a prescribed vehicle speed.

12. A ground contact load control apparatus for a vehicle as set forth in claim 1, wherein the control means comprises an initializing means which, during travel straight ahead, initializes sensors which sense the operating state of the actuators.

13. A ground contact load control apparatus for a vehicle comprising:
   front and rear, left and right load bearing means for supporting the ground contact load of front and rear, left and right wheels, respectively;
   a load changing means which operates to change the load supported by each of the load bearing means;
   a vehicle state sensing means which senses the state of the vehicle; and
   a control means which controls the operation of the load changing means in accordance with a signal from the vehicle state sensing means, wherein the load changing means increases or decreases the ground contact load of any pair of diagonally opposed wheels and the ground contact load of the other pair of diagonally opposed wheels in opposite directions from each other and increases or decreases the ground contact load of diagonally opposed wheels in the same direction as the load changing means, wherein the front and rear, left and right load bearing means which support the ground contact loads of the front and rear, left and right wheels comprise front and rear, left and right suspension hydraulic cylinders each having a single port and mounted on a corresponding one of the front and rear, left and right wheels, and the load changing means which operates to change the ground contact load supported by the suspension hydraulic cylinders comprises a first ground contact load control hydraulic cylinder which receives the hydraulic pressure from each of the suspension hydraulic cylinders mounted on the left and right front wheels and is operated by the pressure difference, another ground contact load control hydraulic cylinder which receives the hydraulic pressure from each of the suspension hydraulic cylinders mounted on the left and right rear wheels and is operated by the pressure difference, an axial force ratio varying mechanism which varies the ratio of the axial force acting on each piston rod of the ground contact load control hydraulic cylinders by changing the position of the support point of an arm connecting both piston rods, an actuator which changes the position of the support point of the arm based on a signal from the vehicle state sensing means, and damping means and elastic means provided between the ground contact load control hydraulic cylinders and the actuator.

14. A ground contact load control apparatus for a vehicle as set forth in claim 1, further comprising a road surface coefficient of friction estimating means which estimates the coefficient of friction of the road surface contacted by the left and right wheels at the time of braking, and a correcting means which controls the operation of the load changing means based on the coefficient of friction of each road surface obtained by the road surface coefficient of friction estimating means and which increases the ground contact load of the front wheel on the high coefficient of friction side and of the rear wheel on the low coefficient of friction side and decreases the ground contact load of the front wheel on the low coefficient of friction side and of the rear wheel on the high coefficient of friction side.

15. A ground contact load control apparatus for a vehicle as set forth in claim 1, wherein the vehicle state sensing means comprises a vehicle speed sensing means which senses the vehicle speed and a steering angle sensor which senses the steering angle and a yaw rate sensor which senses the yaw rate, and the control means comprises a yaw rate estimating means which estimates a target yaw rate based on the vehicle speed sensed by the vehicle speed sensing means and the steering angle sensed by the steering angle sensor, a yaw rate comparing means which compares the target yaw rate estimated by the yaw rate estimating means and the actual yaw rate sensed by the yaw rate sensor, and an operation correction amount determining means which determines an operation correction amount of the load changing means based on the difference between the target yaw rate and the actual yaw rate.

* * * * *